United States Patent
Watanabe et al.

(10) Patent No.: US 9,165,212 B1
(45) Date of Patent: Oct. 20, 2015

(54) PERSON COUNTING DEVICE, PERSON COUNTING SYSTEM, AND PERSON COUNTING METHOD

(71) Applicant: PANASONIC INTELLECTUAL PROPERTY MANAGEMENT CO., LTD., Osaka (JP)

(72) Inventors: Takeshi Watanabe, Kanagawa (JP); Hirofumi Fujii, Kanagawa (JP); Kazuma Yoshida, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/680,464

(22) Filed: Apr. 7, 2015

(30) Foreign Application Priority Data

Apr. 11, 2014 (JP) ................... 2014-081829

(51) Int. Cl.
| | |
|---|---|
| *G06K 9/00* | (2006.01) |
| *G06K 9/52* | (2006.01) |
| *G06K 9/62* | (2006.01) |
| *G06T 7/20* | (2006.01) |
| *H04N 7/18* | (2006.01) |
| *G07C 9/00* | (2006.01) |

(52) U.S. Cl.
CPC .............. *G06K 9/52* (2013.01); *G06K 9/00771* (2013.01); *G06K 9/6215* (2013.01); *G06T 7/20* (2013.01); *G07C 9/00111* (2013.01); *H04N 7/18* (2013.01)

(58) Field of Classification Search
None
See application file for complete search history.

(56) References Cited

U.S. PATENT DOCUMENTS

| 8,238,603 B1 * | 8/2012 | Golan | G06K 9/00778 348/169 |
|---|---|---|---|
| 8,325,976 B1 * | 12/2012 | Golan | G06K 9/00778 382/100 |
| 8,612,278 B1 * | 12/2013 | Ashley, Jr. | G06Q 30/02 705/7.11 |

(Continued)

FOREIGN PATENT DOCUMENTS

| JP | 3218521 B2 | 8/1994 |
|---|---|---|
| JP | 2009-211311 A | 9/2009 |
| JP | 5396192 B2 | 2/2011 |

OTHER PUBLICATIONS

U.S. Appl. No. 14/666,766 to Yuichi Matsumoto et al., which was filed on Mar. 24, 2015 Claims, Spec and Drawings Only.

(Continued)

*Primary Examiner* — Aaron W Carter
(74) *Attorney, Agent, or Firm* — Greeblum & Bernstein, P.L.C.

(57) ABSTRACT

A person counting device according to embodiments of the present invention counts the number of persons passing through a doorway based on an imaged image in which the surroundings of the doorway are imaged. The person counting device includes a moving line acquirer that acquires a moving line for each person detected from the imaged image, a person counter that counts the persons that have passed through the doorway based on the moving line, and a display information generator that generates display information which represents the number of persons that have passed through the doorway based on the counting results of the person counter. The person counter detects an interruption of the moving line in the vicinity of the doorway, determines a similarity between the background image of the doorway and the person image, and includes a deemed counter that deems that the person has passed through the doorway.

9 Claims, 14 Drawing Sheets

(56) References Cited

U.S. PATENT DOCUMENTS

| | | | | |
|---|---|---|---|---|
| 9,025,875 B2* | 5/2015 | Matsumoto | ........ | G06K 9/00369 382/173 |
| 2005/0162515 A1* | 7/2005 | Venetianer | .......... | G06F 17/3079 348/143 |
| 2006/0227862 A1* | 10/2006 | Campbell | .......... | G06K 9/00778 375/240 |
| 2007/0013776 A1* | 1/2007 | Venetianer | ........ | G06K 9/00771 348/143 |
| 2007/0268145 A1* | 11/2007 | Bazakos | ............ | G07C 9/00111 340/573.1 |
| 2009/0220123 A1* | 9/2009 | Tojo | .................. | G06K 9/00771 382/103 |
| 2010/0021009 A1* | 1/2010 | Yao | .................... | G06K 9/00785 382/103 |
| 2010/0026802 A1* | 2/2010 | Titus | ................ | G08B 13/19608 348/143 |
| 2012/0027299 A1* | 2/2012 | Ran | .................... | G06K 9/00778 382/173 |
| 2014/0037147 A1 | 2/2014 | Yoshio et al. | | |
| 2014/0341472 A1 | 11/2014 | Fujimatsu et al. | | |
| 2015/0022025 A1* | 1/2015 | Lee | .......................... | H01H 9/54 307/116 |

OTHER PUBLICATIONS

U.S. Appl. No. 14/613,612 to Hirofumi Fujii et al., which was filed on Feb. 4, 2015 Claims, Spec and Drawings Only.

\* cited by examiner

PERSON COUNTING DEVICE, PERSON COUNTING SYSTEM, AND PERSON COUNTING METHOD

BACKGROUND OF THE INVENTION

1. Field of the Invention

The present invention relates to a person counting device, a person counting system, and a person counting method that counts the number of persons that have passed through a doorway based on an imaged image in which surroundings of a doorway for entering or leaving a predetermined place in a store or the like is imaged.

2. Description of the Related Art

In a store such as a convenience store, a monitoring camera system that monitors persons in the store using an image imaged by a camera installed in the store is widespread. However, if the number of entering persons and leaving persons are acquired by detecting the number of persons passing through the doorway of the store and counting the persons entering and leaving the store using an image imaged by a camera, it can be considered that there will be an improved way of effectively managing the store, and thus, it is possible to improve the sales and profits of the store.

As a device relating to counting the number of persons passing through the doorway of the store, a technology is known in the related art, in which a count line for counting the number of passing persons is set on the image imaged by the camera, and when a moving line for the person acquired from the imaged image crosses the count line, it is determined that the person has crossed the count line, and then, the person is counted (refer to Japanese Patent No. 3218521 and Japanese Patent Unexamined Publication No. 2009-211311).

In addition, a technology is known, in which, a person can reliably be detected by detecting a person from an image imaged by a general monitoring camera and by measuring a distance to the counting target by a range camera using a laser light, even in a situation in which it is difficult to appropriately detect a person in the detection of a person using an image imaged by a general monitoring camera (refer to Japanese Patent No. 5396192).

In a case where the number of persons passing through a doorway of a store is counted, the persons may be detected by an imaged image in which surroundings of the doorway are imaged from the inside of the store. However, when it is difficult to identify a person and the background in such a case where a person is dressed in a color close to black in a situation in which the outside of the store is dark at night time, there is a problem that the person detection may fail and omissions may occur in counting the number of persons, and thus, the accuracy in counting the number of persons deteriorates.

In technologies disclosed in Japanese Patent No. 3218521 and Japanese Patent Unexamined Publication No. 2009-211311, no consideration is taken into account with respect to the above-described problem, and thus, it is difficult to solve the problem of deterioration of the accuracy in counting the number of persons caused by omissions in counting the number of persons.

On the other hand, in a technology disclosed in Japanese Patent No. 5396192, since it is possible to detect a person even in a situation in which it is difficult to appropriately detect a person in the detection of a person using an image imaged by a general monitoring camera, it is possible to reduce omissions in counting the number of persons. However, in that case, there is a problem that the cost increases because a specialized device such as the range camera is needed. Therefore, it is desirable to provide a technology in which the accuracy in counting the number of persons can be improved by reducing omissions in counting the number of persons even in a case where the person detection is performed using only the image imaged by a general monitoring camera without using a specialized device.

SUMMARY OF THE INVENTION

A person counting device according to an aspect of the present invention counts the number of persons passing through a doorway based on an imaged image in which the surroundings of the doorway for entering or leaving the predetermined place in a store or the like are imaged. The person counting device includes: a moving line acquirer that acquires a moving line for each person detected from the imaged image; a person counter that counts the persons that have passed through the doorway based on the moving line acquired by the moving line acquirer; and an output information generator that generates output information which represents the number of persons that have passed through the doorway based on the counting result of the person counter. The person counter includes: a moving line interruption detector that detects an interruption of the moving line in the vicinity of the doorway; a similarity determinator that determines a similarity between the background image in which the doorway is represented and the person image in which the person is represented in the imaged image; and a deemed counter that deems that the person has through the doorway and includes the person in the counting target, in a case where the interruption of the moving line in the vicinity of the doorway is detected by the moving line interruption detector and the similarity determinator determines that the background image and the person image are similar.

DETAILED DESCRIPTION OF THE PREFERRED EMBODIMENTS

Figure 1:
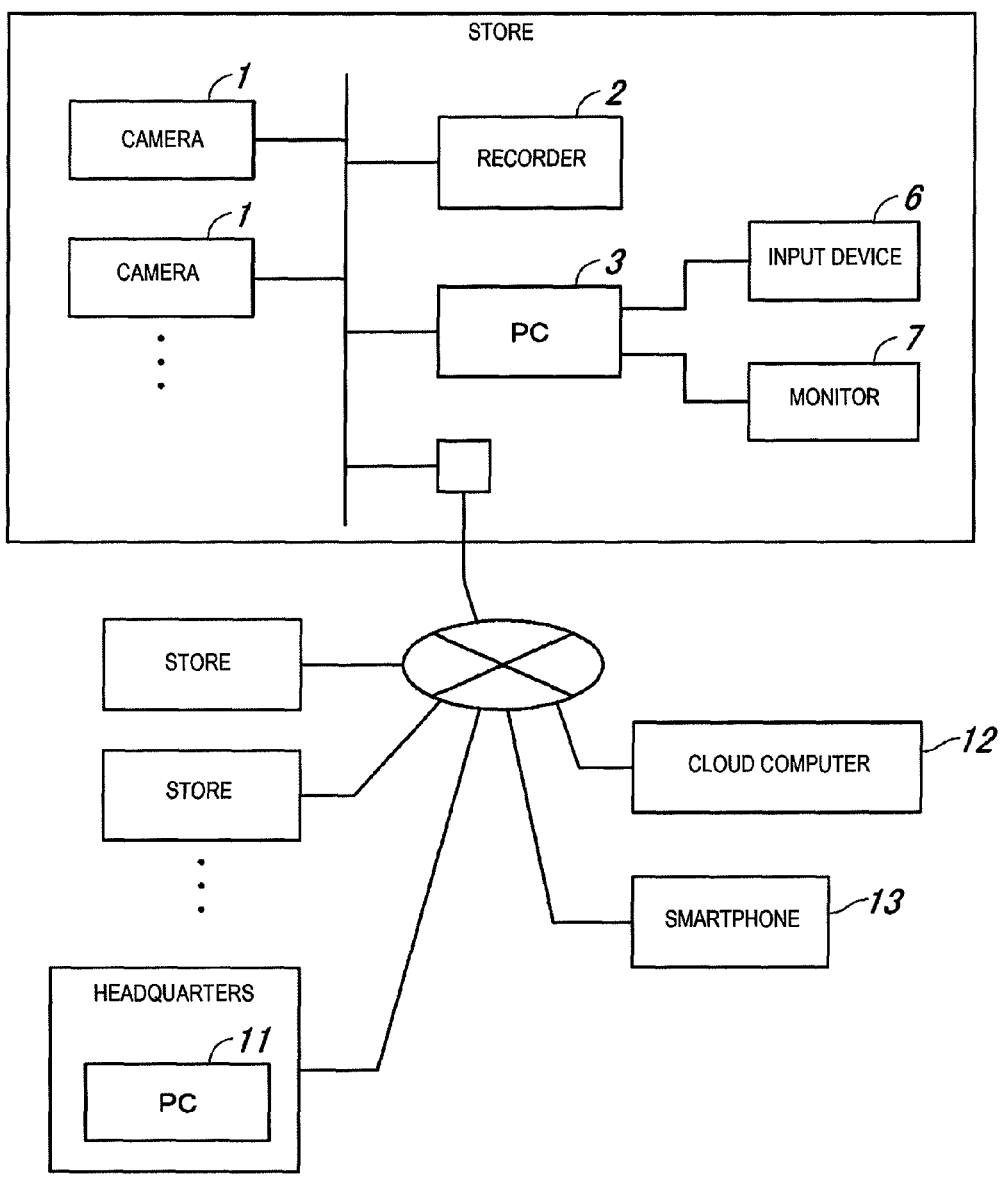
FIG. 1 is an overall configuration diagram of the person counting system in a first embodiment.

The present invention is to provide a person counting device, a person counting system, and a person counting method that is configured such that the accuracy in counting the number of persons can be improved by reducing omissions in counting the number of persons without using a specialized device even in a situation in which an event occurs in which it is difficult to identify the person and the background, and thus, the person detection fails when the person detection is performed by using an image imaged by a general monitoring camera.

According to the first invention, there is provided a person counting device that counts the number of persons passing through a doorway based on an imaged image in which the surroundings of the doorway for entering or leaving the predetermined place in a store or the like are imaged. The person counting device includes: a moving line acquirer that acquires a moving line for each person detected from the imaged image; a person counter that counts the persons that have passed through the doorway based on the moving line acquired by the moving line acquirer; and an output information generator that generates output information which represents the number of persons that have passed through the doorway based on the counting result of the person counter. The person counter includes: a moving line interruption detector that detects an interruption of the moving line in the vicinity of the doorway; a similarity determinator that determines a similarity between the background image in which the doorway is represented and the person image in which the person is represented in the imaged image; and a deemed counter that deems that the person has passed through the doorway and includes the person in the counting target, in a case where the interruption of the moving line in the vicinity of the doorway is detected by the moving line interruption detector and the similarity determinator determines that the background image and the person image are similar.

According to this configuration, in a case where the moving line is interrupted in the vicinity of the doorway and the background image in which the doorway is represented and the person image in which the person is represented are similar, it is assumed that the person detection fails and the moving line is interrupted as a result of an event occurring in which it is difficult to identify the person and the background when the person passes through the doorway. In this case, the person is deemed to have passed the doorway and is included in the counting target. In this way, even in a situation in which an event occurs in which it is difficult to identify the person and the background, and thus, the person detection fails when the person detection is performed by using an image imaged by a general monitoring camera, it is possible to reduce omissions in counting the number of persons and improve the accuracy in counting the number of persons without using a specialized device.

In addition, according to the second invention, in a case where the person moves in a direction of leaving, the similarity determinator acquires the background image from an image area which is a movement destination of the person after the moving line disappears in the imaged image, and in a case where the person moves to a direction of entering, the similarity determinator acquires the background image from an image area which is a movement origin of the person before the moving line appears in the imaged image.

According to this configuration, it can be determined whether or not the person image and the background image are similar, that is, whether or not the event occurs in which it is difficult to identify the person and the background, and it is possible to acquire the appropriate background image.

In addition, according to the third invention, the person counting device further includes an area setter that sets the first area in the imaged image by the input operation of the user so as to include the image area in which the person is positioned at the middle of passing through the doorway, and sets the second area in the vicinity of the first area inside of the store so as to include the image area in which the person in and out from the doorway positions. If the moving line sequentially enters the first area and the second area, the person counter determines that the moving line has passed through the doorway, and then, the person is counted.

According to this configuration, in a case where the event in which it is difficult to identify the person and the background does not occur, it is possible to accurately count the persons passing through the doorway. The order in which the moving line enters the first area and the second area after passing through the doorway in a case of entering is different from that in a case of leaving.

In addition, according to the fourth invention, the moving line interruption detector detects the interruption of the moving line in the second area.

According to this configuration, in the second area set so as to include the image area in the vicinity of the first area inside of the room, the possibility of occurrence of the interruption of the moving line due to an event in which it is difficult to identify a person and the background is high. Therefore, by detecting the interruption of the moving line in the second area, it is possible to reliably detect the interruption of the moving line due to the event in which it is difficult to identify a person and the background.

In addition, according to the fifth invention, the similarity determinator acquires the background image from the image area of the first area in the imaged image, and determines the similarity between the background image and the person image.

According to this configuration, in the first area set so as include the image area in which the person is positioned at the middle of passing through the doorway, the situation outside the room is imaged via the doorway, since the color of this situation outside the room and the appearance of the person are similar, it is difficult to identify the person and the background, and thus, the person detection fails. Therefore, by determining the similarity between the background image acquired from the image area of the first area and the person image, it is possible to accurately detect the reason for the failure of the person detection, that is, the occurrence of an event in which it is difficult to identify the person and the background.

In addition, according to the sixth invention, the similarity determinator extracts feature amounts relating to at least one of brightness information and color information from the background image and the person image respectively, compares each of the feature amounts, and determines the similarity between the background image and the person image.

According to this configuration, it is possible to accurately determine the similarity between the background image and the person image. Particularly, since the person detection is usually performed using the brightness information, by determining the similarity based on the brightness information, it is possible to accurately detect the reason for the failure of the person detection, that is, the occurrence of the event in which it is difficult to identify the person and the background.

In addition, according to the seventh invention, the person counting device further includes an aggregator that aggregates the counting results of the person counter for each predetermined aggregation period and acquires the number of persons for each predetermined aggregation period. The person counter determines a moving direction of the person passing through the doorway based on the moving line acquired by the moving line acquirer, and separately counts the entering persons and the leaving persons passing through the doorway according to the moving direction. The aggregator aggregates the counting results of the person counter for each predetermined aggregation period and acquires the number of entering persons and the leaving persons for each predetermined aggregation period. The output information generator generates the output information relating to the number of entering persons and the leaving persons for each predetermined aggregation period acquired by the aggregator.

According to this configuration, it is possible for the user to check the number of persons entering the room and leaving the room for each predetermined aggregation period. If the numbers of persons entering the room and leaving the room for each predetermined aggregation period are arranged in time series, it is possible for the user to simply check the situation of temporal trends in the number of persons entering the room and leaving the room, or if the numbers of persons entering the room and leaving the room at a date and time different each other are arranged so as to be compared, it is possible for the user to check the difference in the numbers of persons entering the room and leaving the room in terms of the date and time.

In addition, according to the eighth invention, there is provided a person counting system that counts the number of persons that have passed through a doorway based on an imaged image in which the surroundings of a doorway for entering or leaving a predetermined place in a store or the like are imaged. The person counting system includes: a camera that images surroundings of the doorway; and a plurality of information processing devices. Any of the plurality of information processing devices includes: a person tracker that detects a person from the image imaged by the camera and acquires position information; a moving line acquirer that acquires a moving line for each person based on the position information acquired by the person tracker; a person counter that counts the persons passed though the doorway based on the moving line acquired by the moving line acquirer; and an output information generator that generates output information which represents the number of persons that have passed through the doorway based on the counting result of the person counter. The person counter includes: a moving line interruption detector that detects an interruption of the moving line in the vicinity of the doorway; a similarity determinator that determines a similarity between the background image in which the doorway is represented and the person image in which the person is represented in the imaged image; and a deemed counter in which the person is deemed to have passed through the doorway and the person is included as the counting target, in a case where the interruption of the moving line in the vicinity of the doorway is detected by the moving line interruption detector and the similarity determinator determines that the background image and the person image are similar.

According to this configuration, similarly to the first invention, even in a situation in which an event occurs in which it is difficult to identify the person and the background, and thus, the person detection fails when the person detection is performed by using the image imaged by a general monitoring camera, it is possible to reduce omissions in counting the number of persons and improve the accuracy in counting the number of persons without using a specialized device.

In addition, according to the ninth invention, there is provided a person counting method that causes the information processing device to perform the processing of counting the number of persons passing through a doorway based on an imaged image in which the surroundings of the doorway for entering or leaving the predetermined place in a store or the like are imaged. The person counting method includes steps of acquiring a moving line for each person detected from the imaged image; counting the persons that have passed through the doorway based on the moving line acquired by the step of acquiring; and generating output information which represents the number of persons that have passed through the doorway based on the counting result from the step of counting. The step of counting the persons includes steps of: detecting an interruption of the moving line in the vicinity of the doorway; determining a similarity between the background image in which the doorway is represented and the person image in which the person is represented in the imaged image; and deeming that the person has passed through the doorway and including the person in the counting target, in a case where the interruption of the moving line in the vicinity of the doorway is detected by the step of detecting the moving line interruption, and the background image and the person image are determined to be similar by the step of determining the similarity.

According to this configuration, similarly to the first invention, even in a situation in which an event occurs in which it is difficult to identify the person and the background, and thus, the person detection fails when the person detection is performed by using the image imaged by a general monitoring camera, it is possible to reduce omissions in counting the number of persons and improve the accuracy in counting the number of persons without using a specialized device.

Hereinafter, embodiments of the present invention will be described with reference to the drawings.

FIRST EXEMPLARY EMBODIMENT

FIG. 1 is an overall configuration diagram of the person counting system in a first embodiment. This person counting system is built into a retail store such as a convenience store, and includes camera 1, recorder (image recording device) 2, and PC (person counting device) 3.

Camera 1 is installed at an appropriate position in the store and the monitoring area in the store is imaged by camera 1. Imaged images obtained from the imaging are accumulated in recorder 2.

Input device 6 such as a mouse that performs various input operations of a user such as a monitoring person and monitor (display device) 7 that displays a monitor screen are connected to PC 3. Input device 6 and monitor 7 may be configured with a touch panel display.

PC 3 is installed in a security room of the store and the monitoring person (security guard) can browse through the imaged images inside the store imaged by camera 1 in real time using the monitor screen displayed on monitor 7. In addition, it is possible to browse through the imaged images inside the store imaged in the past and recorded in recorder 2.

A monitor which is not illustrated is also connected to PC 11 installed in a headquarters, and the imaged images inside the store imaged by camera 1 can be browsed through in real time or the imaged images inside the store imaged in the past and recorded in recorder 2 can be browsed through, and thus, it is possible to check the situations in the store at the headquarters. PCs 3 and 11 include a processor (CPU) and a program memory. The CPU of PC 3 is realized by causing the program (instruction) for monitoring to be executed. The program may be installed to PC 3 in advance as the information processing device and may configure the dedicated device, or may be provided to the user by being recorded in an appropriate program recording medium as an application program that operates on a general-purpose OS or via a network.

Figure 2:
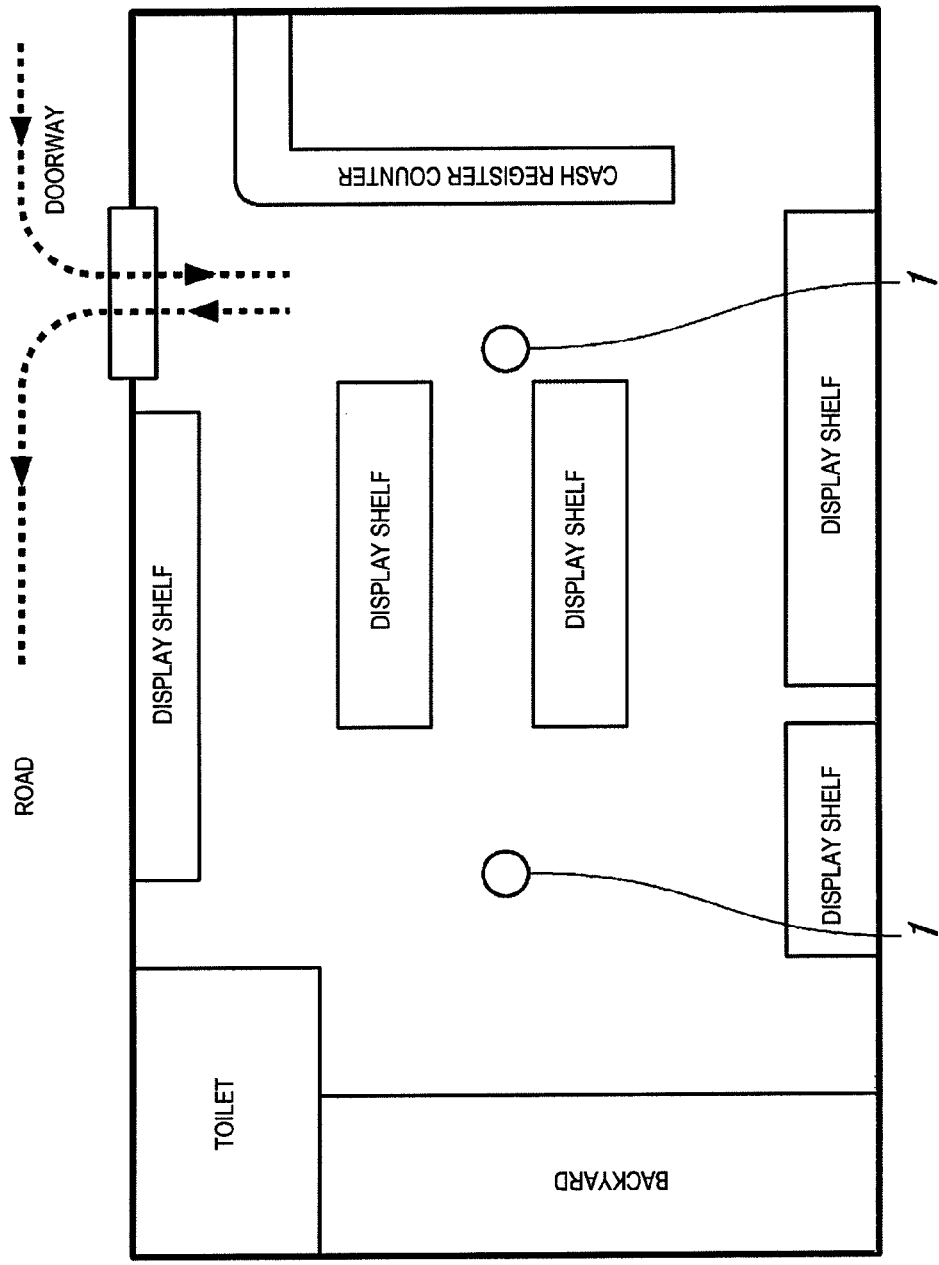
FIG. 2 is a plan view of a store explaining a layout of the store and an installation state of a camera.

Next, a layout of the store and an installation state of camera 1 will be described with a convenience store as an example. FIG. 2 is a plan view of a store explaining the layout of the store and the installation state of camera 1.

A doorway, display shelves, a cash register counter, and the like are provided in the store. On the display shelves, boxed lunches, bottled beverages, or rice balls are installed separately as types of the product. Customers enter the store through the doorway and move in the store through isles between the display shelves, and when a desired product is found, go to the cash register counter with the product to finish the accounting (payment of the price of the products) at the cash register counter, and then, go out from the store through the doorway.

In addition, in the store, a plurality of cameras 1 that image inside the store (monitoring area) is installed. This camera is installed at an appropriate position on the ceiling. Particularly, in the example illustrated in FIG. 2, omni-directional cameras having an imaging range of 360° using a fish-eye lens in camera 1 are adopted, and the persons entering the store through the doorway and the persons moving in the store can be imaged by such cameras 1.

Figure 3A:
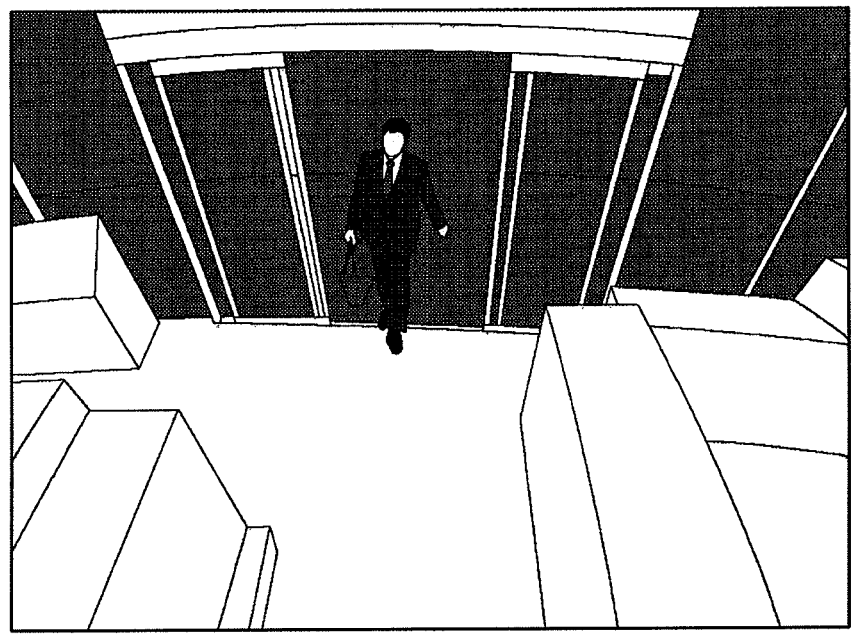
FIG. 3A and FIG. 3B are explanatory diagrams illustrating situations in which it is difficult to identify a person and the background.
Figure 3B:
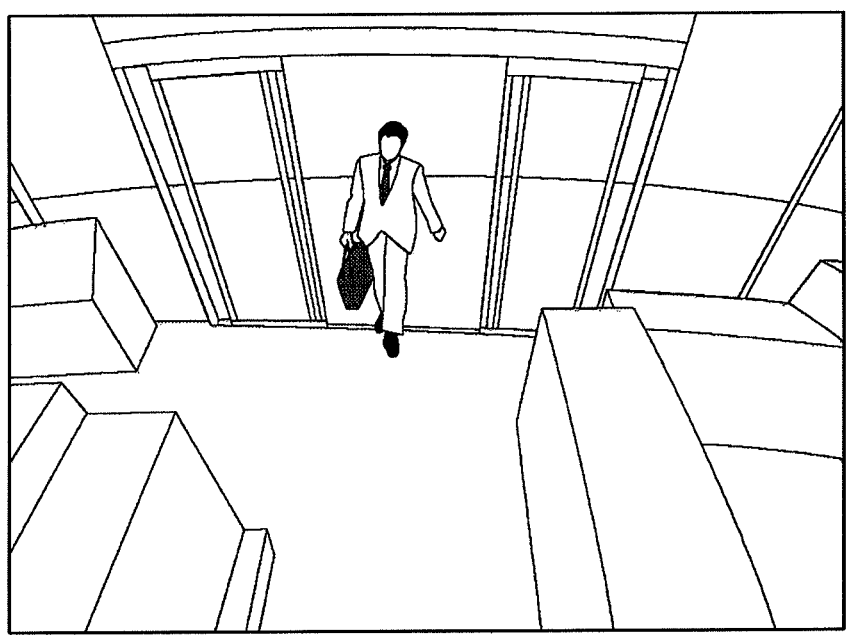

Next, the case where a situation in which an event occurs in which it is difficult to identify the person and the background, and thus, the person detection fails, will be described. FIG. 3A and FIG. 3B are explanatory diagrams illustrating the situations in which it is difficult to identify a person and the background.

In the present embodiment, camera 1 is installed on the ceiling of the store and the imaged image is obtained in which the surroundings of the doorway are imaged from obliquely above the inside of the store. In this imaged image, the doorway, a floor of the store, display shelves, and a cash register counter are represented. Particularly, in an image area around the doorway, a road outside the store is represented via the doorway. Here, in the present embodiment, the person detection is performed for detecting the person from the image imaged by camera 1. However, when the person passes through the doorway, if an appearance of the person, particularly the color of dress is similar to the situation outside the store which is the background of the image, it is difficult to identify the person and the background, and thus, there is a case where the person detection fails.

For example, as illustrated in FIG. 3A, in a case where a person is dressed in a color close to black in a situation in which the outside is dark at night, since the outline of the person becomes blurred and it is difficult to identify the person and the background, there is a possibility that the person detection fails. In addition, as illustrated in FIG. 3B, in a case where a person is dressed in a color close to white in a situation in which the outside is bright during the day time of a fine day, since the outline of the person becomes blurred and it is difficult to identify the person and the background as well, there is a possibility that the person detection may fail. Particularly, in a situation in which overexposure occurs due to sunlight, it becomes more difficult to identify the person and the background. Therefore, the probability that the person detection fails increases.

As the situations in which it is difficult to identify a person and the background, besides the cases illustrated in FIG. 3A and FIG. 3B, there are various cases such as: a case where the person is dressed in a color close to white in a situation in which the outside is white due to snowfall, a case where the person is dressed in a color close to a color of a vehicle traveling on the road, or a case where the person is dressed in a color close to a color of a wall of the facing building.

As described above, if the situation in which the event occurs in which it is difficult to identify the person and the background, and thus, the person detection fails, omissions occur during counting the number of persons and the accuracy in counting the number of persons deteriorates. Therefore, in the present embodiment, as will be described below, when the failure in detecting the person in the vicinity of the doorway is detected, a verification is performed of whether or not an event has occurred in which it is difficult to identify the person and the background and which is the reason for the failure of the person detection, and when it is confirmed that an event has occurred in which it is difficult to identify the person and the background, that person is deemed to have passed through the doorway and is counted as a passed person. In this way, it is possible to reduce omissions in counting the number of persons and improve the accuracy in counting the number of persons.

Figure 4:
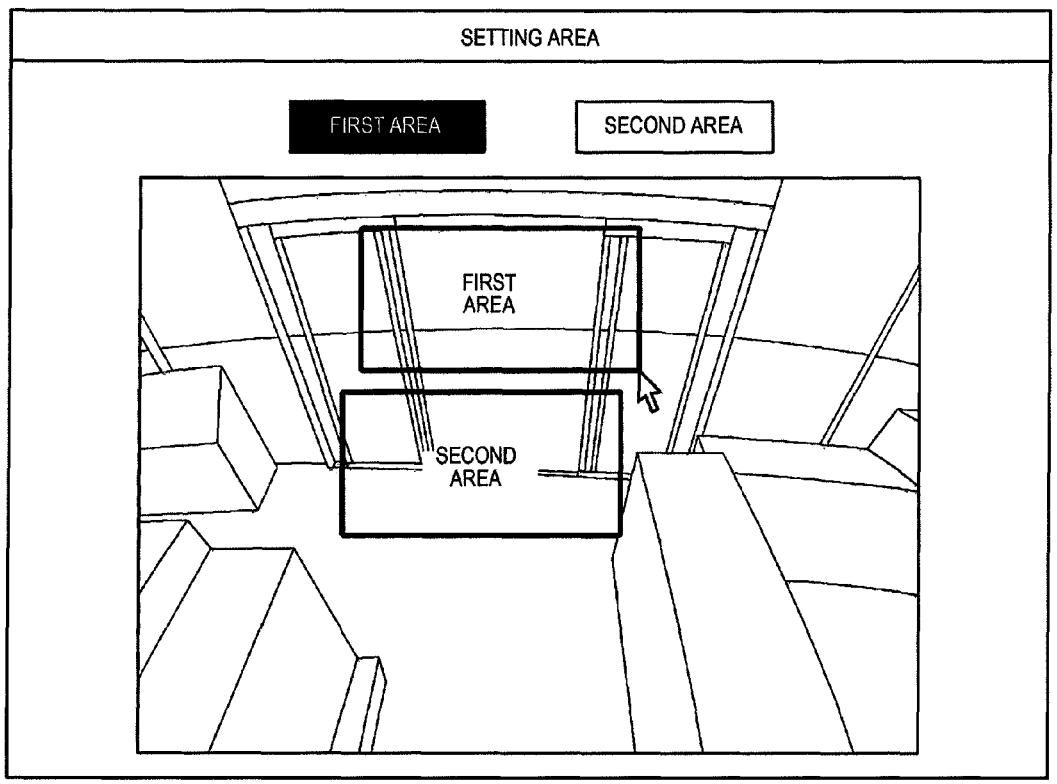
FIG. 4 is an explanatory diagram illustrating an area setting screen displayed on a monitor.

Next, a first area and a second area that are set on the imaged image will be described. FIG. 4 is an explanatory diagram illustrating an area setting screen displayed on monitor 7.

In the present embodiment, in order to count the number of persons that have passed through the doorway, the first area and the second area are set on the imaged image, and the area setting screen that causes the user to perform the setting of the first area and the second area is displayed on monitor 7. The imaged image obtained from camera 1 or recorder 2 is displayed on the area setting screen, and the user inputs the positions of the first area and the second area on the imaged image using an input device 6 such as a mouse.

The first area is set so as to include the image area where the person is located in the middle of passing through the doorway. The second area is set so as to include the image area of the inside of the store in the vicinity of the first area. Particularly, in the example illustrated in FIG. 4, the imaged image is an image in which the surroundings of the doorway are imaged from obliquely above the inside of the store. The first area is set on the inner side seen from camera 1 and on the upper side of the image area, and the second area is set on the front side seen from camera 1 and on the lower side of the image area.

In addition, in the present embodiment, a moving line for each person detected from the imaged image is acquired, and if the moving line enters the first area and the second area in this order, then the person is determined as having passed through the doorway and is counted. Therefore, in order to prevent omissions in counting the number of persons in the ordinary state in which situations (refer to FIGS. 3A and 3B) in which it is difficult to identify a person and the background do not occur, the first area and the second area are set such that the moving lines of the persons passing through the doorway pass through both of the first and second areas.

Next, a situation of the person detection when the person passes through the doorway to leave the store will be described. FIG. 5A, FIG. 5B, FIG. 5C, FIG. 6A, FIG. 6B, and FIG. 6C are explanatory diagrams illustrating the situations of detecting a person when the person passes through the doorway to leave the store. FIG. 7A and FIG. 7B are explanatory diagrams illustrating the situations of moving lines in each case of FIG. 5A, FIG. 5B, FIG. 5C, FIG. 6A, FIG. 6B, and FIG. 6C.

Here, in the present embodiment, a rectangular person frame is set in the image area of the upper half body of the person detected by the person detection, and a center point of the person frame is assumed to be the position of the person.

Figure 5A:
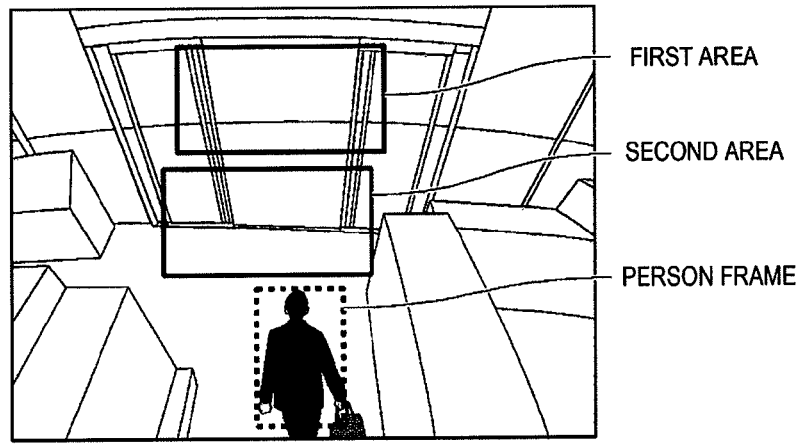
FIG. 5A, FIG. 5B, and FIG. 5C are explanatory diagrams illustrating situations of detecting a person when the person passes through the doorway to leave the store.
Figure 5B:
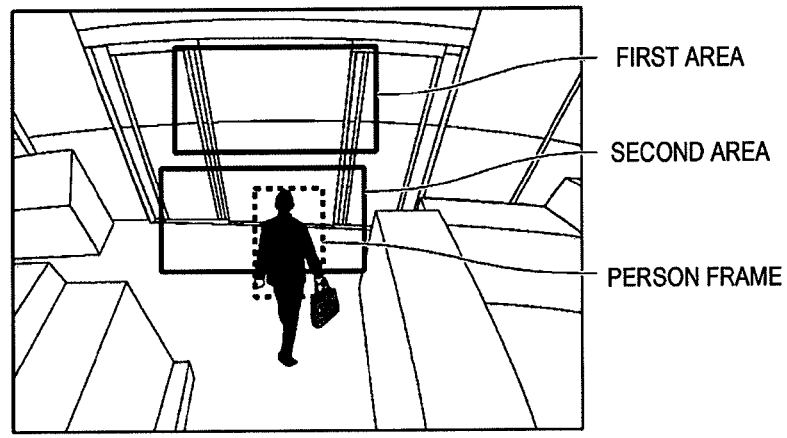
Figure 5C:
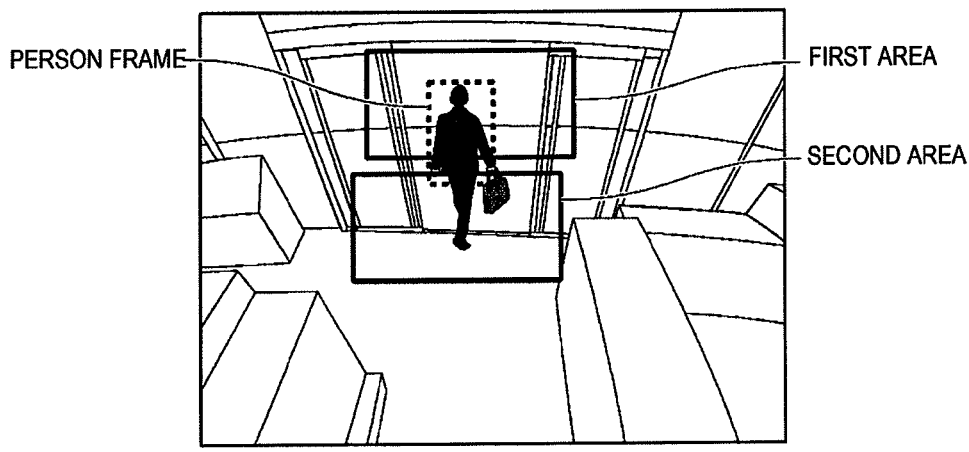

When the person passes through the doorway to leave the store, in the situation in which an event (refer to FIGS. 3A and 3B) in which it is difficult to identify a person and the background does not occur, the person continues to be successfully detected at the time point when the person is away from the doorway as illustrated in FIG. 5A, at the time point when the person approaches the doorway and enters the second area as illustrated in FIG. 5B, and at the time point when the person enters the first area at the middle of passing through the doorway as illustrated in FIG. 5C. For this reason, as illustrated in FIG. 7A, the moving line is continuously obtained in the state in which the person sequentially passes through the second area and the first area.

Figure 6A:
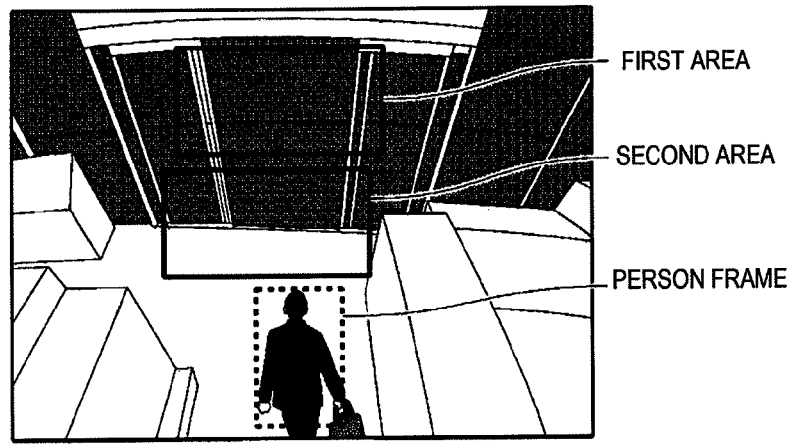
FIG. 6A, FIG. 6B, and FIG. 6C are explanatory diagrams illustrating situations of detecting a person when the person passes through the doorway to leave the store.
Figure 6B:
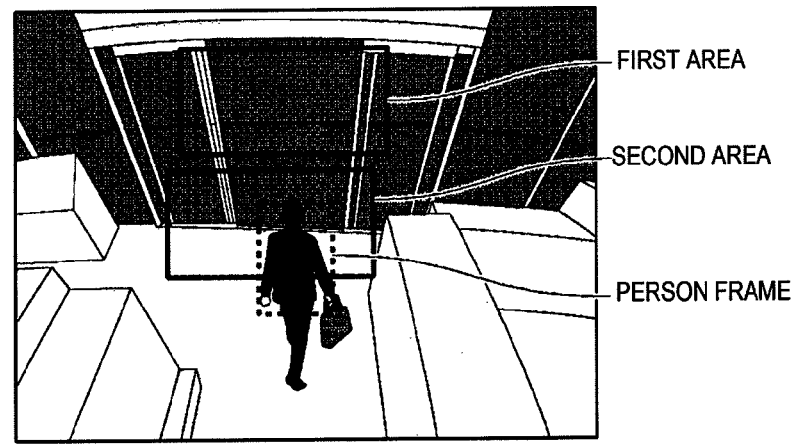
Figure 6C:
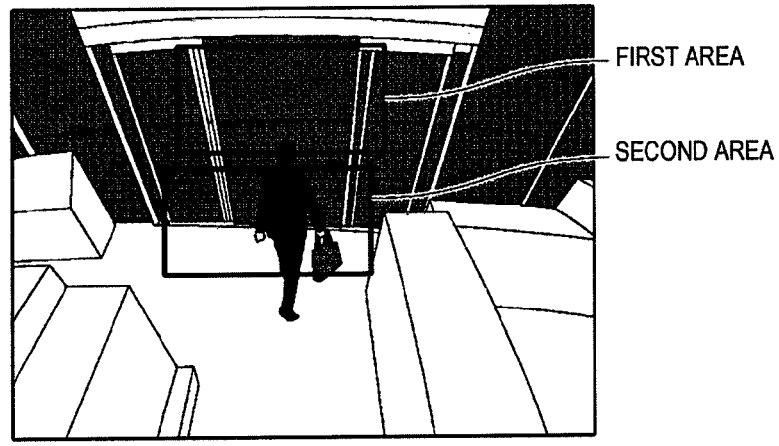
Figure 7A:
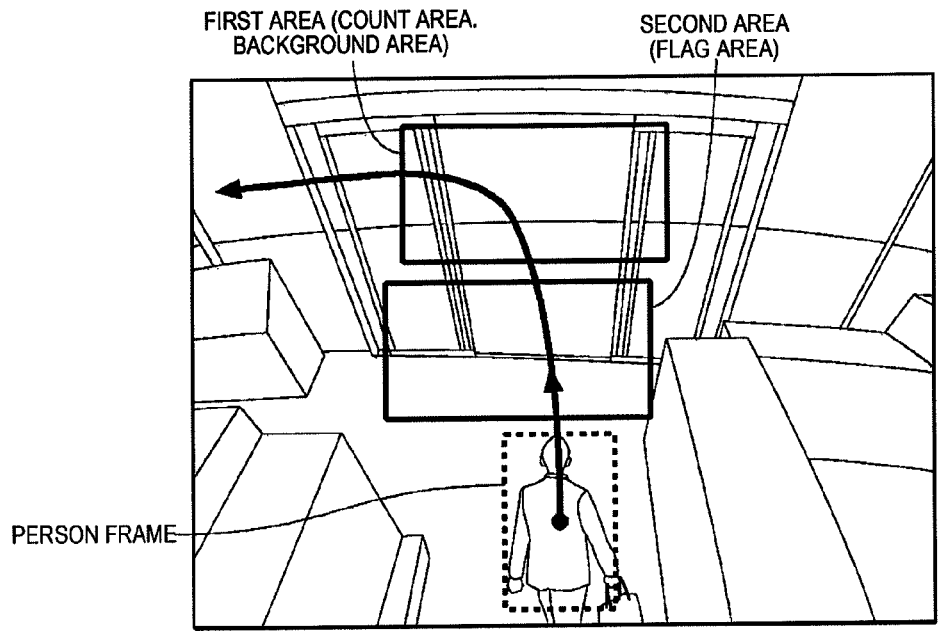
FIG. 7A and FIG. 7B are explanatory diagrams illustrating situations of a moving line in each case of FIG. 5A, FIG. 5B, FIG. 5C, FIG. 6A, FIG. 6B, and FIG. 6C.
Figure 7B:
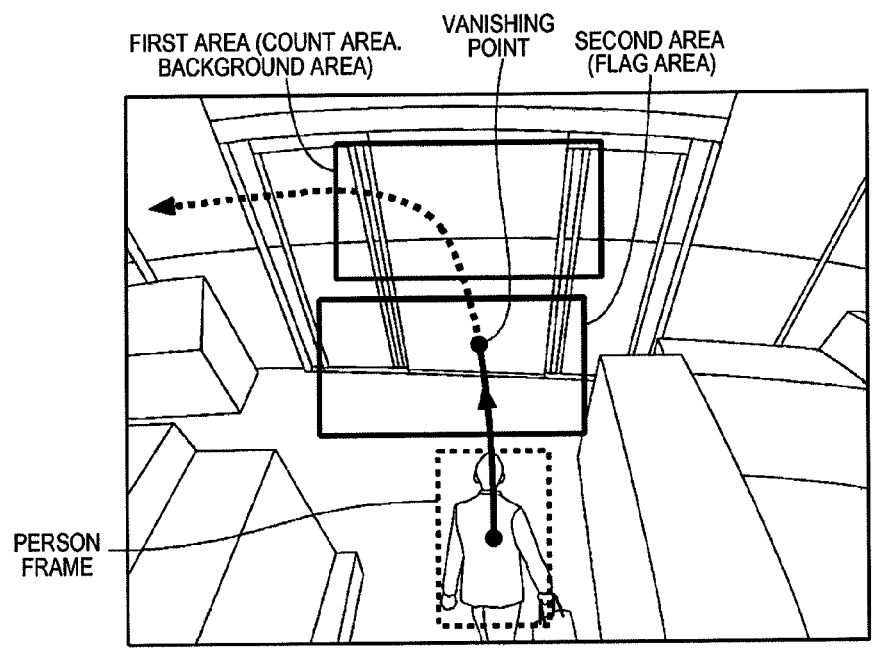

On the other hand, in the situation in which an event occurs in which it is difficult to identify a person and the background (refer to FIG. 3), the person can successfully be detected at the time point when the person is away from the doorway as illustrated in FIG. 6A and at the time point when the person approaches the doorway and enters the second area as illustrated in FIG. 6B. However, if the person in the middle of the second area enters the dark image area as illustrated in FIG. 6C, the person detection fails. For this reason, as illustrated in 7B, the moving line is obtained in an interrupted state in which the moving line disappears before passing through the doorway, particularly, the moving line is interrupted in the second area, and thus, a vanishing point (ending point) of the moving line exists in the second area.

Therefore, in the present embodiment, in a case where the person moves in a direction of leaving the store, if the moving line is detected as entering the first area after entering the second area, with the first area as the count area, the person is counted as having passed through the doorway.

In addition, with the second area as a flag area, when the moving line is in the state of being interrupted in the second area, even though it is not clear whether the moving line enters the first area or not, the person is flagged as if he may have passed through the doorway, the verification of whether an event in which it is difficult to identify the person and the background has occurred or not is performed, and in a case where it is verified that an event has occurred in which it is difficult to identify the person and the background, the person is counted as having passed through the doorway.

Next, the state of detecting the person when the person passes through the doorway to enter the store will be described. FIG. 8A, FIG. 8B, FIG. 8C, FIG. 9A, FIG. 9B, and FIG. 9C are explanatory diagrams illustrating situations of detecting the person when the person passes through the doorway to enter the store. FIG. 10A and FIG. 10B are explanatory diagrams illustrating situations of the moving line in each case of FIG. 8A, FIG. 8B, FIG. 8C, FIG. 9A, FIG. 9B, and FIG. 9C.

Figure 8A:
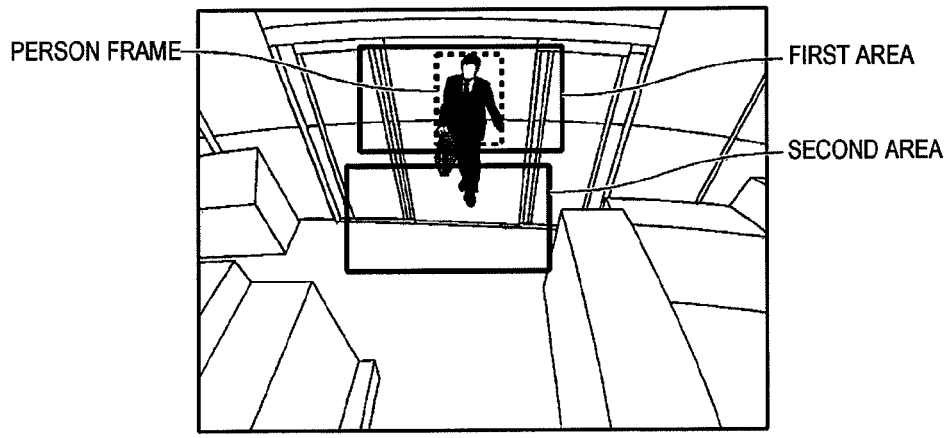
FIG. 8A, FIG. 8B, and FIG. 8C are explanatory diagrams illustrating situations of detecting a person when the person passes through the doorway to enter the store.
Figure 8B:
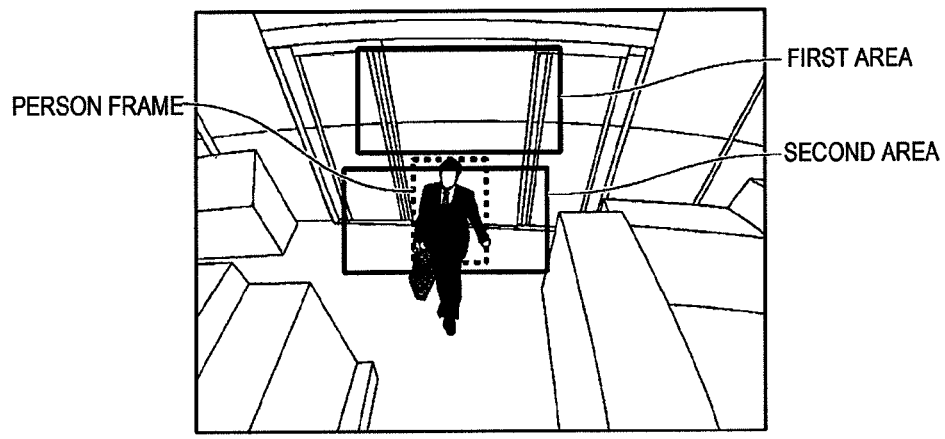
Figure 8C:
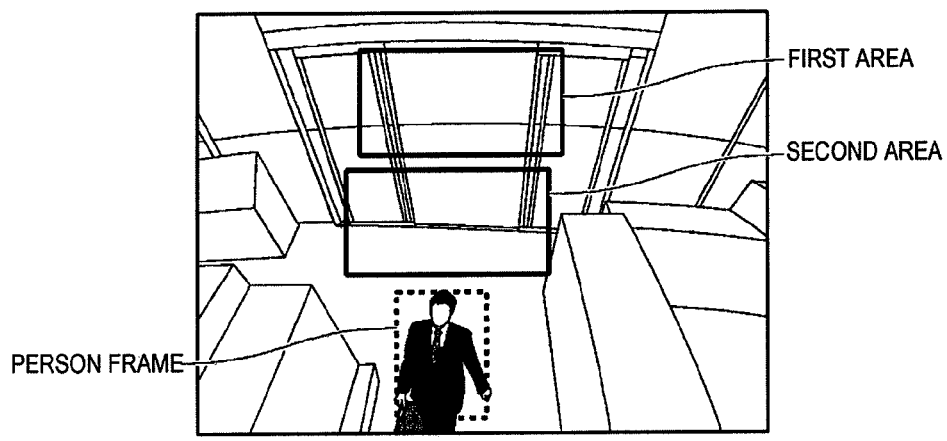

When the person passes through the doorway to enter the store, in the situation in which an event (refer to FIG. 3) in which it is difficult to identify the person and the background does not occur, the person continues to be successfully tracked at the time point when the person enters the first area before entering the store from the doorway as illustrated in FIG. 8A, at the time point when the person enters the store from the doorway and enters the second area as illustrated in FIG. 8B, and at the time point when the person is away from the doorway as illustrated in FIG. 8C. For this reason, as illustrated in FIG. 10A, the moving line is continuously obtained in the state that the person sequentially passes through the first area and the second area.

Figure 9A:
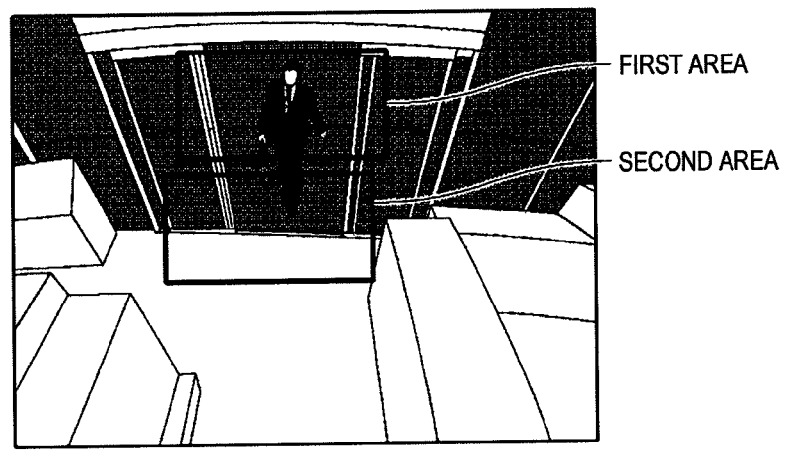
FIG. 9A, FIG. 9B, and FIG. 9C are explanatory diagrams illustrating situations of detecting a person when the person passes through the doorway to enter the store.
Figure 9B:
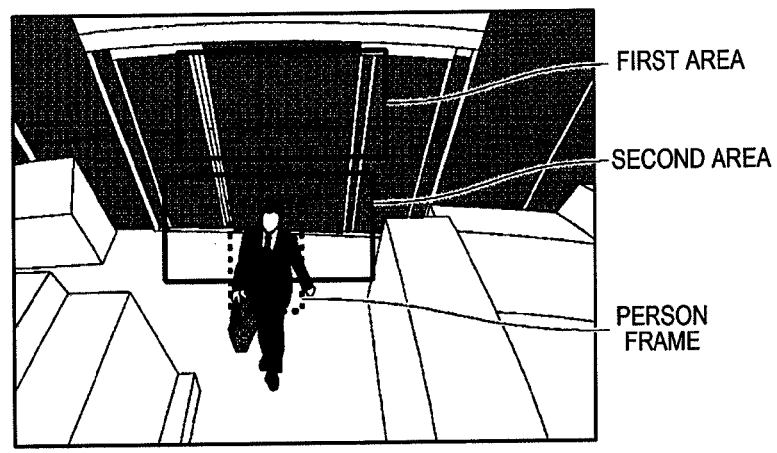
Figure 9C:
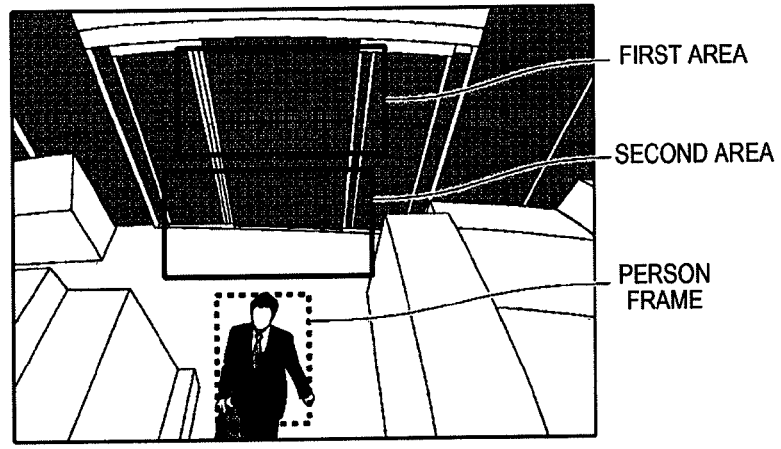
Figure 10A:
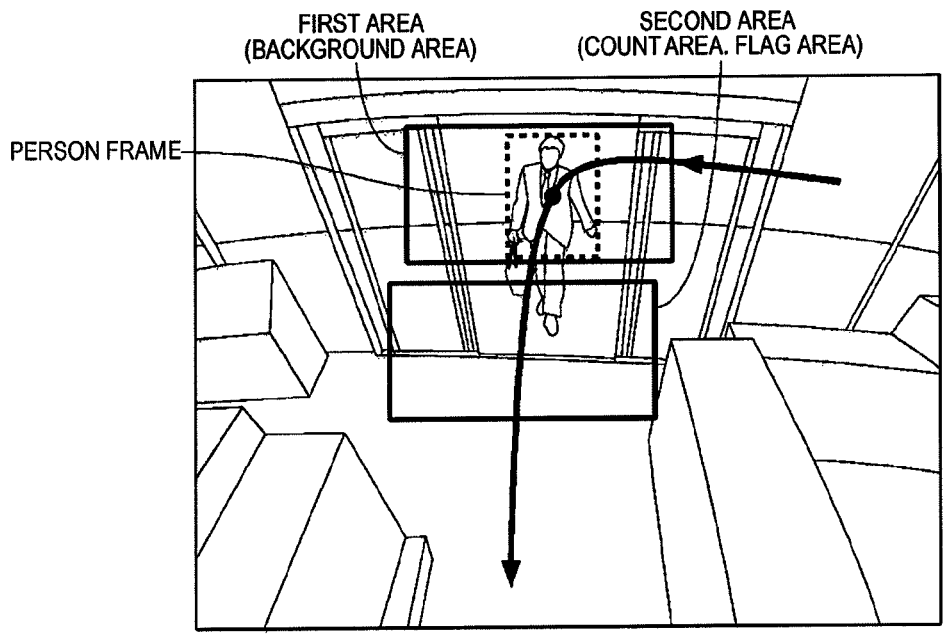
FIG. 10A and FIG. 10B are explanatory diagrams illustrating situations of a moving line in each case of FIG. 8A, FIG. 8B, FIG. 8C, FIG. 9A, FIG. 9B, and FIG. 9C.
Figure 10B:
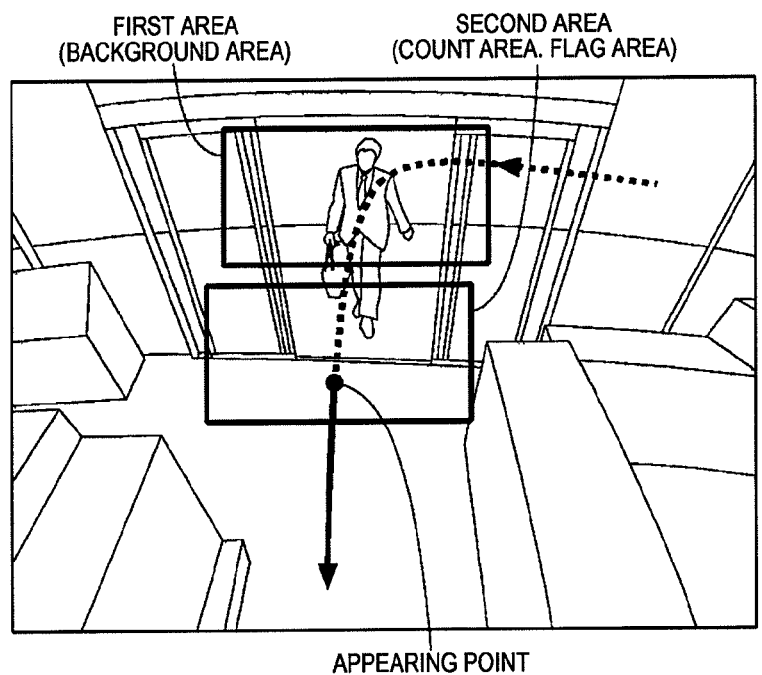

On the other hand, in the situation in which an event (refer to FIG. 3) occurs in which it is difficult to identify the person and the background, the person detection fails at the time point when the person enters the first area before entering the store from the doorway as illustrated in FIG. 9A. However, the person is successfully detected at the time point when the person enters the store from the doorway and progresses to the middle of the second area as illustrated in FIG. 9B, and also successfully detected at the time point when the person is away from the doorway as illustrated in FIG. 9C. For this reason, as illustrated in FIG. 10B, the moving line is obtained in an interrupted state in which the moving line appears after passing through the doorway, particularly, the moving line is interrupted in the second area, and thus, an appearing point (starting point) of the moving line exists in the second area.

Therefore, in the present embodiment, in a case where the person moves in a direction of entering the store, if the moving line is detected as entering the second area after entering the first area, with the second area as the count area, the person is counted as having passed through the doorway.

In addition, with the second area as a flag area, when the moving line is in the state of being interrupted in the second area with the second area as a flag area, even though it is not clear whether the moving line enters the first area or not, the person is flagged as if he may have passed through the doorway, the verification of whether an event in which it is difficult to identify the person and the background has occurred or not is performed, and in a case where it is verified that an event has occurred in which it is difficult to identify the person and the background, the person is counted as having passed through the doorway.

The verification of whether an event in which it is difficult to identify the person and the background has occurred or not is performed by a similarity determination in which the similarity between the background image in which the doorway is represented in the imaged image and the person image in which the person is represented is determined. In the present embodiment, with the first area as a background area, the background area is acquired from the image area of the first area and the person image is acquired from the image area of the person frame, and then, it is determined whether the background image and the person image are similar or not. In a case where the background image and the person image are similar, it is determined that an event has occurred in which it is difficult to identify the person and the background.

In the present embodiment, in this way, when the failure in detecting the person in the vicinity of the doorway due to the interruption of the moving line is detected, the verification of whether or not an event in which it is difficult to identify the person and the background and which is the reason for the failure of the person detection has occurred, is performed by a determination of the similarity between the background image and the person image, and when it is confirmed that an event has occurred in which it is difficult to identify the person and the background, that person is deemed to have passed through the doorway and is counted as a passed person.

The second area (flag area) is an area where the interruption of the moving line that occurs when the person passes through the doorway is detected, and the second area (flag area) is set such that the probability of the interruption of the moving line occurring is high, that is, there is high probability of an ending point or a starting point of the moving line existing Here, the second area (flag area) may be set so as to extend over the area where the person detection is likely to fail and the area where the person is likely to be successfully detected, specifically, as illustrated in FIG. 3A to FIG. 10B, in the imaged image in which the surroundings of the doorway are imaged from obliquely above the inside of the store, the second area (flag area) may be set so as to extend over the image area of the doorway and the image area of the floor in the store.

Figure 11:
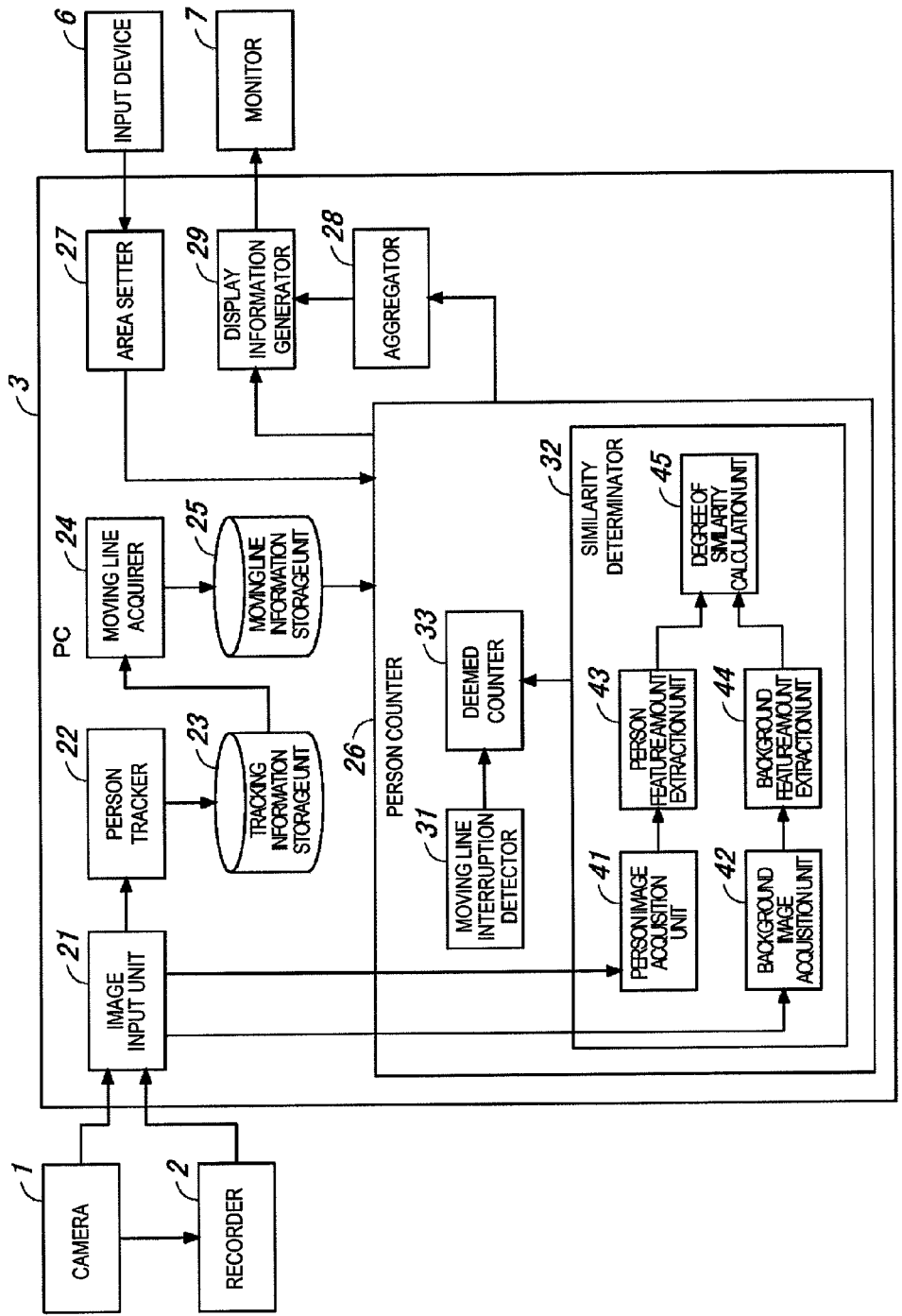
FIG. 11 is a functional block diagram illustrating a schematic configuration of a PC.

Next, person counting processing performed in PC3 illustrated in FIG. 1 will be described. FIG. 11 is a functional block diagram illustrating a schematic configuration of PC 3.

PC 3 includes image input unit 21, person tracker 22, tracking information storage unit 23, moving line acquirer 24, moving line information storage unit 25, person counter 26, area setter 27, aggregator 28, and display information generator (output information generator) 29.

Processing of acquiring the imaged image from camera 1 or recorder 2 is performed in image input unit 21. In a case where the person counting is performed in real time, the imaged image acquired from camera 1, and in case where the person counting is performed using the imaged image in the past, the imaged image is acquired from recorder 2.

In person tracker 22, the person is detected from camera 1 and the tracking information for each person (position information or the like) is output. In this person tracking processing, a known image recognition technology (person detection technology, person tracking technology, and the like) may be used. The tracking information acquired by person tracker 22 is stored in tracking information storage unit 23.

Information relating to the position of each person detected from the image (frame) imaged by camera 1 and the detection time of each person acquired from the imaging time of the frame from which the person is detected is included in the tracking information.

In moving line acquirer 24, processing of acquiring the moving line for each person is performed based on the position information of each person generated in person tracker 22 and stored in tracking information storage unit 23. The information relating to the moving line for each person acquired by moving line acquirer 24 is stored in moving line information storage unit 25.

In area setter 27, processing of setting the first area and the second area (refer to FIG. 4) is performed according to the input operation by the user. Here, the first area is the background area and second area is the flag area. However, the count area at the time of leaving the store and the count area at the time of entering the store are different from each other, and the setting of the count area using any one of the first area or the second area is also performed according to the input operation by the user.

In person counter 26, processing of counting the number of persons passing through the doorway is performed based on the moving line for each person acquired by moving line acquirer 24 and stored in moving line information storage unit 25. In the present embodiment, when the moving line sequentially enters the first area and the second area, the moving line is determined to have passed through the doorway, and the person is counted as a passed person.

In person counter 26, it is determined whether or not the moving line enters the first area or the second area based on an intersecting state between the sides (boundary line) of the first area and the second area and the moving line. However, for the determination, obtaining the intersection of the sides of the first area and the second area and the moving line is not needed, and the determination may be performed with only the position information arranged in time series. For this reason, in the moving line acquired by the moving line acquirer 24, line segment (vector) information for linking the detection positions is not necessarily needed.

In addition, in the present embodiment, the person is counted when the moving line entering the count area (the first area or the second area) is detected. However, the person may be counted when the moving line coming out of the count area is detected. In addition, the fact that the person passes through the doorway may be determined by considering a dwell time in the count area set based on a walking speed of the person. In addition, even in a case where the moving line sequentially enters the first area and the second area, it can be considered that there may be a case where the person passes by the vicinity of the doorway without passing through the doorway. The fact that the person passes through the doorway may be determined by adding a condition relating to the position of the moving line such that the above-described person is excluded from the counting target.

In addition, in person counter 26, processing of determining a direction of the person passing through the doorway is performed based on the moving line acquired by moving line acquirer 24, and then, processing of separately counting the persons entering the store and the persons leaving the store after passing through the doorway is performed according to the moving direction. That is, in a case where the moving line enters the first area from the second area in this order, it is determined that the person leaves the store, and, in a case where the moving line enters the second area from the first area in this order, it is determined that the person enters the store.

In addition, in person counter 26, in a case where a predetermined condition is satisfied, deemed counting processing is performed, in which the person is deemed to have passed through the doorway and is included as the counting target. Person counter 26 includes moving line interruption detector 31, similarity determinator 32, and deemed counter 33 in relation to the deemed counting processing.

In moving line interruption detector 31, processing of detecting that the moving line acquired by moving line acquirer 24 is interrupted in the vicinity of the doorway is performed. In the present embodiment, the interruption of the moving line in the second area, that is, the fact that an ending point or a starting point of the moving line exists in the second area, is detected.

In similarity determinator 32, processing of determining the similarity between the background image in which the doorway is represented and the person image in which the person is represented in the imaged image is performed. Similarity determinator 32 includes person image acquisition unit 41, background image acquisition unit 42, person feature amount extraction unit 43, background feature amount extraction unit 44, and degree of similarity calculation unit 45.

In person image acquisition unit 41, processing of acquiring the person image from the latest imaged image from which the person is detected is performed. In the present embodiment, the person image is acquired from the image area of the person frame on the imaged image. In background image acquisition unit 42, processing of acquiring the background image from the imaged image is performed. In the present embodiment, the background image is acquired from the image area of the first area. Since it is desirable that the person is not represented in the background image, the background image may be acquired from an imaged image from which the person is not detected. In addition, the background image can be acquired by synthesizing a plurality of imaged images in which the person image has been excluded.

In person feature amount extraction unit 43, processing of extracting a person feature amount from the person image acquired by person image acquisition unit 41 is performed. In background feature amount extraction unit 44, processing of extracting a background feature amount from the background image acquired by background image acquisition unit 42 is performed. In this processing of extracting the background feature amount, a feature amount relating to at least one of brightness information and color information is extracted. As the feature amount relating to the brightness information, there are, for example, a brightness average value which is an average value of the brightness of each pixel and a brightness histogram which represents the level (the number of pixels) of each brightness (gradation). As the feature amount relating to the color information, there are, for example, a color average value in which values of each color (channel) of each pixel are averaged for each color and a color histogram which represents the level (the number of pixels) of each value (gradation) of each color.

In degree of similarity calculation unit 45, processing of comparing the person feature amount acquired by person feature amount extraction unit 43 and the background feature amount acquired by background feature amount extraction unit 44, and calculating a degree of similarity between the person image and the background image are performed. In this processing of calculating the degree of similarity, for example, in a case where the brightness histogram is used as the feature amount, the brightness histograms respectively acquired from the person image and the background image are compared, and the degree of similarity which represents the degree of overlapping each other is calculated.

When the degree of similarity is calculated by degree of similarity calculation unit 45, in similarity determinator 32, the determination of the similarity between the background image and the person image is performed based on the degree of similarity. In this similarity determination, the degree of similarity is compared with a threshold value and in a case where the degree of similarity exceeds the threshold value, it is determined that the background image and the person image are similar.

In deemed counter 33, in a case where it is detected by moving line interruption detector 31 that the moving line is interrupted in the vicinity of the doorway and it is determined by similarity determinator 32 that the person image and the background image are similar, the processing in which the person is deemed to have passed through the doorway and is included as the counting target is performed. When the person is included as the counting target by deemed counter 33, the person counter 26 counts the person as having passed through the doorway.

In aggregator 28, processing of aggregating the counting results of person counter 26 for each predetermined aggregation period (for example, hourly, daily, weekly, or monthly) and acquiring the number of persons that have passed through the doorway (number of persons entering the store and leaving the store) for each predetermined aggregation period, is performed. The aggregation period can appropriately be determined according to the needs of the user, for example, with the aggregation period based on an hour or a day basis, the number of persons entering the store and leaving the store for each hour or each day is acquired. In addition, in the person counting in a real time, the total number of persons from the opening of the store may be acquired.

In addition, in aggregator 28, the number of persons present in the store at the present time or at a certain past time can be obtained by sequentially performing the addition of the number of persons entering the store and subtraction of the number of persons leaving store. Furthermore, by aggregating the number of persons present in the store at a specific time point for each aggregation period, the number of persons present in the store for each aggregation period can be obtained.

In a case where a plurality of doorways is installed, processing of separately counting the persons passing through each doorway is performed in person counter 26, and in aggregator 28, the number of persons entering the store and leaving the store for each doorway is acquired from the counting results counted by person counter 26 for each doorway. In this way, it is possible for the user to check the difference between the usages of each doorway.

In display information generator (output information generator) 29, processing of generating the display information (output information) which represents the number of persons passing through the doorway is performed based on the counting results of person counter 26.

In addition, in display information generator 29, processing of generating the display information (output information) which represents the aggregation by aggregator 28, that is, the number of persons for each predetermined aggregation period, is performed. The display information generated by the display information generator is output to monitor 7 and the number of persons that have passed through the doorway is displayed on monitor 7.

Each unit of PC 3 illustrated in FIG. 5 is realized by causing the person counting program to be executed in the CPU of PC 3. The program may be installed in PC 3 in advance as the information processing device and may configure a dedicated device, or may be provided to the user by being recorded in an appropriate program recording medium as an application program that operates on a general-purpose OS or via a network.

Figure 12:
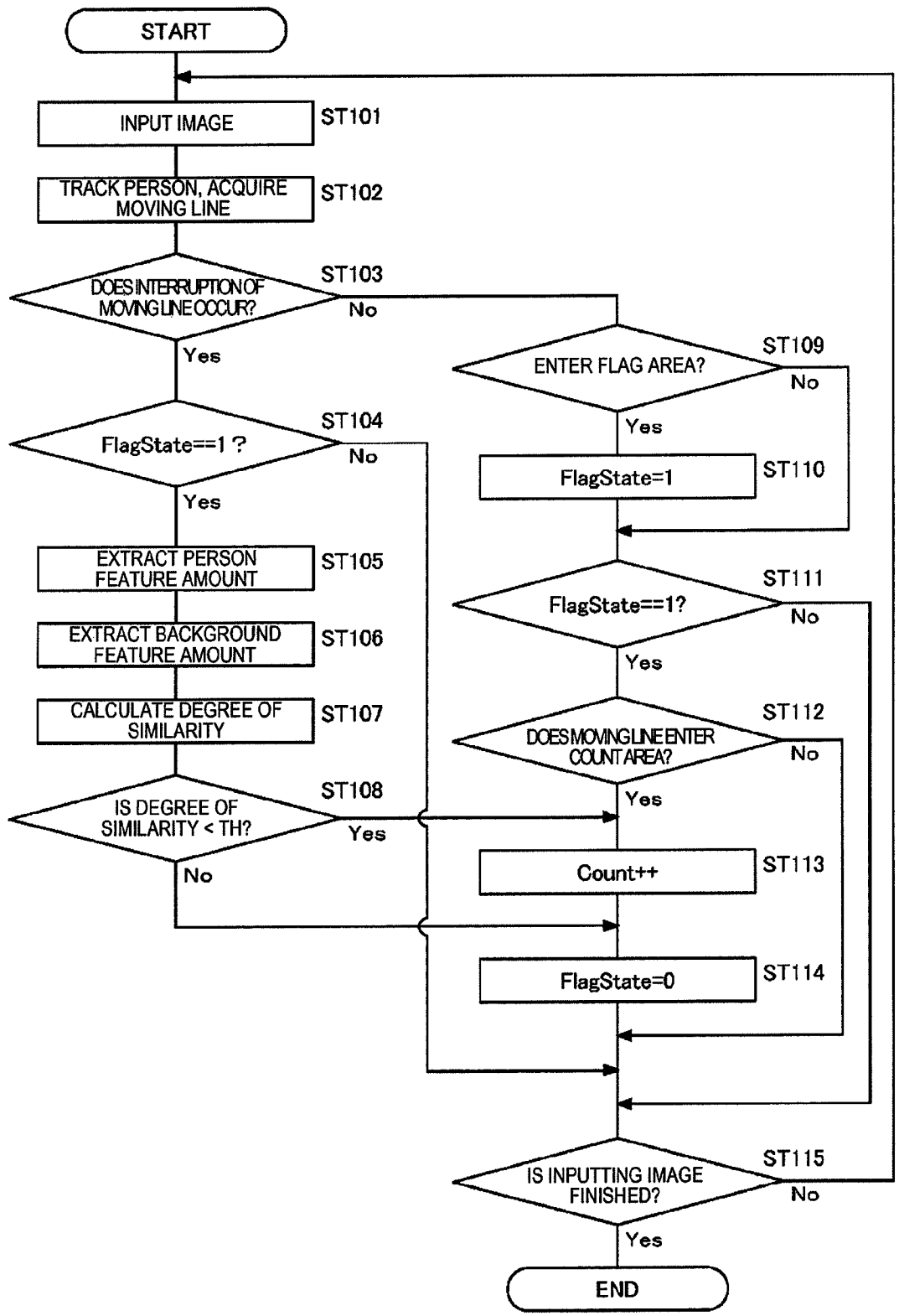
FIG. 12 is a flowchart illustrating a procedure of person counting processing performed in the PC.

Next, a procedure of the person counting processing performed by PC 3 illustrated in FIG. 11 will be described. FIG. 12 is a flowchart illustrating the procedure of the person counting processing performed by PC 3.

Here, in a case where the person leaves the store, the first area is the count area, and in a case where the person enters the store, the second area is the count area. Further, the second area is a flag area. In addition, a flag that indicates that the moving line enters the flag area (the second area) is set for each person. An initial value of this flag is assumed to be OFF (flag state=0).

First, in image input unit 21, the imaged image (frame) imaged by camera 1 or recorder 2 is input (ST101), and in person tracker 22, the processing of detecting the person from the imaged image and acquiring the position information is performed. Subsequently, in moving line acquirer 24, the processing of acquiring the moving line for the person is performed (ST102). In a case where a plurality of persons is detected from the imaged image, the processing thereafter is performed for each person.

Next, in person counter 26, the determination of whether or not the interruption of the moving line occurs is performed (ST103). In a case where the interruption of the moving line does not occur (No in ST103), the determination of whether or not the moving line enters the flag area is performed (ST109). In a case where the moving line enters the flag area (Yes in ST109), the flag of that person is set to ON (flag state=1) (ST110).

Next, the determination of whether or not the flag of the person is ON (flag state=1) is performed (ST111), and in a case where the flag is ON (Yes in ST111), the determination of whether or not the moving line enters the count area is performed (ST112). In a case where the moving line enters the count area (Yes in ST112), the processing of increasing the count value with an increment of one (count++) is performed (ST113).

If the flag state is set to OFF (flag state=0) (ST114) and the determination of whether or not the inputting of the entire imaged image is finished is performed (ST115), and if the inputting of all the imaged image is finished (No in ST115), the process proceeds to the processing of the next imaged image.

In addition, if the moving line does not enter the flag area (No in ST109), the flag of the person is maintained as OFF and the process proceeds to the processing of the next image. In addition, if the moving line enters the flag area (Yes in ST109) but does not enter the count area (No in ST112), the incremental increase of the count value (ST113) and the initialization of the flag (ST114) are not performed, and the flag of the person is maintained as ON and the process proceeds to the processing of the next imaged image.

On the other hand, in a case where the interruption of the moving line occurs (Yes in ST103), the determination of whether or not the flag of the person is ON (flag state=1) is performed (ST104). If the flag is ON, that is, in a case where the moving line enters the flag area in the processing of previous imaged image but does not enter the count area (Yes in ST104), the processing of extracting the feature amount from the person image (ST105), the processing of extracting the feature amount from the background image (ST106), and the processing of calculating the degree of similarity of the feature amounts (ST107) are performed.

The determination of whether or not the degree of similarity is greater than threshold value TH is performed (ST108). In a case where the degree of similarity is greater than threshold value TH, that is, in a case where it is determined that the person image and the background image are similar (Yes in ST108), the processing of increasing the count value with the increment of one (count++) is performed (ST113). On the other hand, in a case where the degree of similarity is not greater than threshold value TH (No in ST108), the flag is set to OFF (flag state=0) (ST114) and the process proceeds to the processing of the next imaged image.

In addition, in a case where the interruption of the moving line occurs (Yes in ST103), if the flag is OFF (flag state=0) (No in ST104), the process directly proceeds to the processing of the next imaged image.

In the example illustrated in FIG. 12, the processing of extracting the feature amounts of the person image and the background image is performed at the timing when the interruption of the moving line occurs. However, the processing may be performed for each imaged image (frame) regardless of the interruption of the moving line, or may be performed regularly at appropriate timings. In addition, it is desirable that the background image is acquired from an imaged image in which the person is not represented, for example, the background image may be acquired in a case where the person is not detected from the imaged image. Furthermore, it is desirable that the background image is acquired from the most recent imaged image, for example, the background image may be updated every time an imaged image in which the person is not detected is found, and then, the most recent background image may be used.

Figure 13:
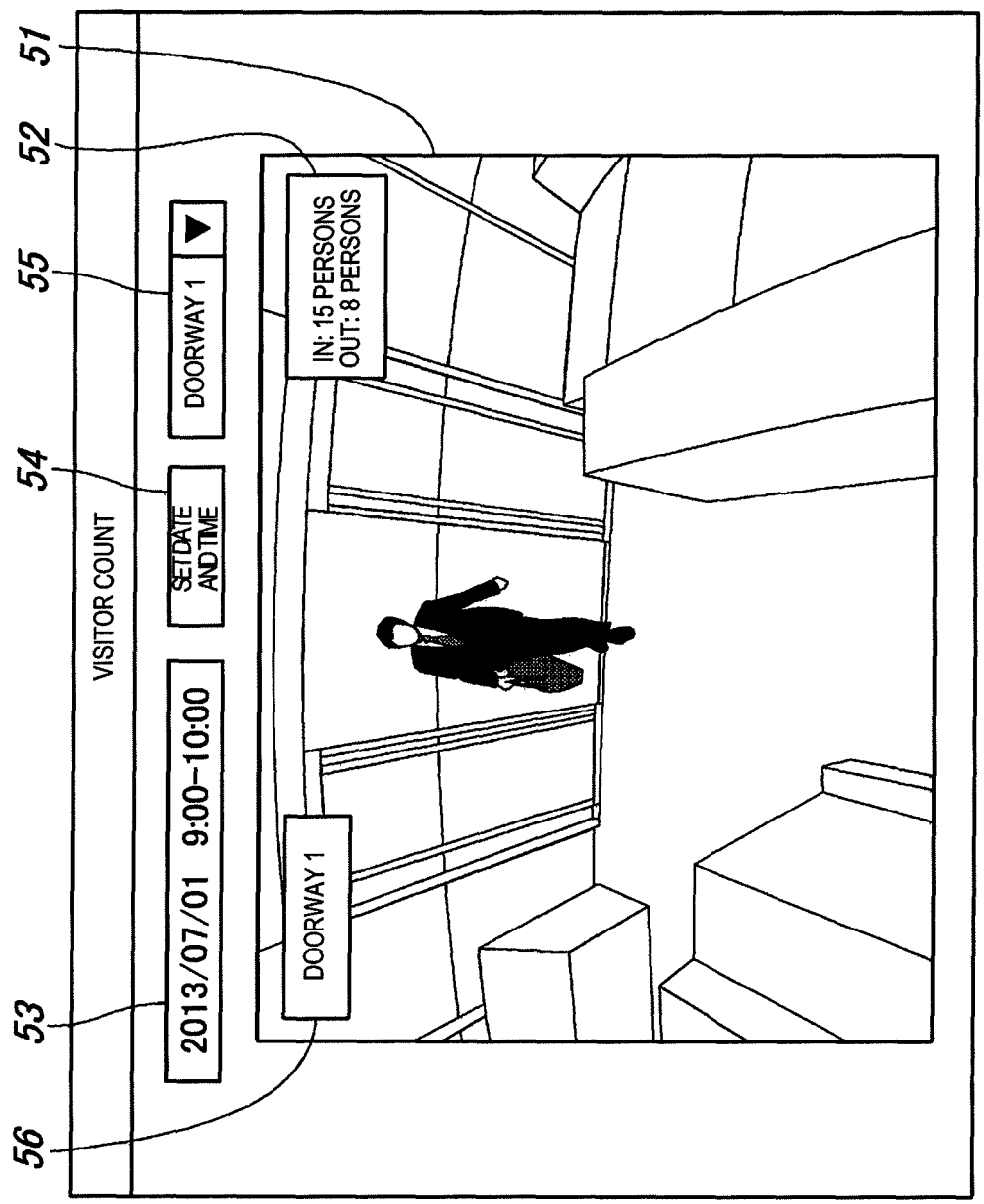
FIG. 13 is an explanatory diagram illustrating a person counting screen displayed on the monitor.

Next, a person counting screen for the user to view the person counting results will be described. FIG. 13 is an explanatory diagram illustrating a visitor count screen (person counting screen) displayed on monitor 7.

In the present embodiment, in display information generator 29, the display information that represents the number of persons passing through the doorway is generated based on the counting results of person counter 26, and is output to monitor 7, and the person counting screen for the user to view the person counting results is displayed on monitor 7. In this person counting screen, imaged image display portion 51, person counting result display portion 52, date and time display portion 53, date and time setting button 54, doorway selection button 55, and doorway display portion 56 are provided.

The image imaged by camera 1 is displayed in imaged image display portion 51. The number of persons entering the store (in) and the number of persons leaving the store (out) which are person counting results are displayed in person counting result display portion 52.

Date and time display portion 53 displays the date and time, and date and time setting button 54 is used for setting the date and time. When operating date and time setting button 54, a date and time setting screen (not illustrated) is displayed, and when the date and time is selected here, the selected date and time is displayed in date and time display portion 53, and the imaged image of the selected date and time is displayed in imaged image display portion 51, or the person counting results of the selected date and time are displayed in person counting result display portion 52. In addition, when the date and time can be set as the current time, the imaged image and the person counting results are respectively displayed in imaged image display portion 51 and person counting result display portion 52 in real time.

Doorway selection button 55 is used for selecting the doorway in a case where a plurality of doorways are installed in the store, and when a doorway is selected using doorway selection button 55, the name of the doorway is displayed in doorway display portion 56 and the imaged image and the person counting results of the selected doorway are respectively displayed in imaged image display portion 51 and person counting result display portion 52. In addition, in the screen of monitor 7, a plurality of display windows for displaying the visitor counts are set, and by selecting the respective doorways, the imaged image and the person counting results may be displayed in a manner of allowing comparison.

As described above, in the present embodiment, in moving line interruption detector 31, the interruption of the moving line in the vicinity of the doorway is detected, in similarity determinator 32, the similarity between the background image in which the background is represented and the person image in which the person is represented in the imaged image is determined, and in a case where the moving line is interrupted in the vicinity of the doorway and person image and the background image are similar, it is deemed that the person passes through the doorway in deemed counter 33, and then, the person is included in the counting target. Therefore, even in the situation in which an event occurs in which it is difficult to identify the person and the background, and the person detection fails, it is possible to reduce omissions in counting the number of persons and improve the accuracy in counting the number of persons without using a specialized device.

In addition, in the present embodiment, in similarity determinator 32, in a case where the person moves in a direction of leaving the store, the background image is acquired from the image area which is the destination of the person after the moving line disappears in the imaged image, and in a case where the person moves in a direction of entering the store, the background image is acquired from the image area which is the destination of the person before the moving line appears in the imaged image. Therefore, it can be determined whether or not the person image and the background image are similar, that is, whether or not an event occurs in which it is difficult to identify the person and the background, and it is possible to acquire the appropriate background image.

In addition, in the present embodiment, in area setter 27, the first area is set in the imaged image by the input operation of the user so as to include the image area in which the person is positioned at the middle of passing through the doorway, and the second area is set in the vicinity of the first area inside of the store so as to include the image area in which the person coming in and going out from the doorway is positioned, and in person counter 26, if the moving line sequentially enters the first area and the second area, it is determined that the moving line have passed through the doorway, and then, the person is counted. Therefore, in a case where an event in which it is difficult to identify the person and the background does not occur, it is possible to accurately count the persons passing through the doorway.

In addition, in the present embodiment, in moving line interruption detector 31, the interruption of the moving line in the second area is detected, and in the second area set so as to include the image area in the vicinity of the first area inside of the store, the probability of the interruption of the moving line occurring due to an event in which it is difficult to identify a person and the background is high. Therefore, by detecting the interruption of the moving line in the second area, it is possible to reliably detect the interruption of the moving line due to an event in which it is difficult to identify a person and the background.

In addition, in the present embodiment, in similarity determinator 32, the background image is acquired from the image area of the first area in the imaged image, and the similarity between the background image and the person image is determined. Thus, in the first area set so as include the image area in which the person is positioned at the middle of passing through the doorway, the situation outside the store is imaged via the doorway, since the color of this situation outside the store and the appearance of the person are similar, it is difficult to identify the person and the background, and thus, the person detection fails. Therefore, by determining the similarity between the background image acquired from the image area of the first area and the person image, it is possible to accurately detect the reason for the failure of the person detection, that is, the occurrence of an event in which it is difficult to identify the person and the background.

In addition, in the present embodiment, in similarity determinator 32, the feature amount relating to at least one of the brightness information and the color information is respectively extracted from the background image and the person image, and the similarity between the background image and the person image is determined by comparing each of the feature amounts. Therefore, it is possible to accurately determine the similarity between the background image and the person image. Particularly, since the person detection is usually performed using the brightness information, by determining the similarity based on the brightness information, it is possible to accurately detect the reason for the failure of the person detection, that is, the occurrence of an event in which it is difficult to identify the person and the background.

In addition, in the present embodiment, in person counter 26, the moving direction of the person passing through the doorway is determined based on the moving line acquired by moving line acquirer 24, and the number of persons entering the store and leaving the store are separately counted according to the moving direction, in aggregator 28, the counting results in the person counter 26 are aggregated for each predetermined aggregation period and the numbers of persons entering the store and leaving the store for each predetermined aggregation period are acquired, and in display information generator 29, the display information relating to the number of persons entering the store and leaving the store for each predetermined aggregation period obtained by the aggregator 28 is generated. Therefore, it is possible for the user to check the number of persons entering the store and leaving the store for each predetermined aggregation period. If the numbers of persons entering the store and leaving the store for each predetermined aggregation period are arranged in time series, it is possible for the user to simply check the situation of temporal trends of the number of persons entering the store and leaving the store, or if the numbers of persons entering the store and leaving the store at dates and times different each other are arranged so as to be compared, it is possible for the user to check the difference in the numbers of persons entering the store and leaving the store in terms of the date and time.

SECOND EXEMPLARY EMBODIMENT

Figure 14:
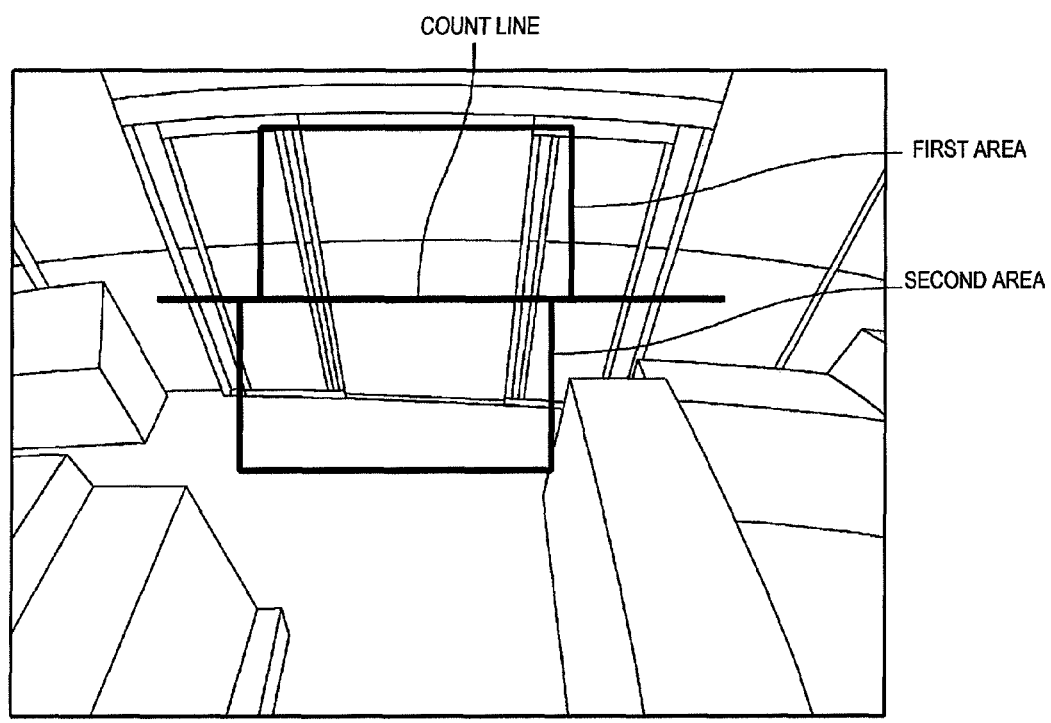
FIG. 14 is an explanatory diagram illustrating a count line set on an imaged image in a second embodiment.

Next, a second embodiment will be described. FIG. 14 is an explanatory diagram illustrating a count line set on the imaged image in the second embodiment.

In the first embodiment, the first area and the second area are separately set in the imaged image. However, in the second embodiment, the first area and the second area are set so as to be in contact with each other and the count line is set on the boundary between the first area and the second area.

In addition, in the first embodiment, any one of the first area and the second area is set as the count area according to the moving direction of the person, that is, according to whether the person moves in the direction of entering the store or the person moves in the direction of leaving the store, and when the moving line enters the count area, then, the person is counted. However, in the second embodiment, if the moving line crosses the count line, the person is counted.

The first area is the background area from which the background image is acquired similarly to the first embodiment, and the second area is the flag area in which the interruption of the moving line is detected and the person who may have passed through the doorway is flagged similarly to the first embodiment.

As described above, specific embodiments of the present invention are described. However, the embodiments are merely examples and the present invention is not limited by those embodiments. In addition, each of the configuration elements of the person counting device, the person counting system, and the person counting method in the present invention illustrated in each of the embodiments described above is not necessarily required in its entirety, and can be appropriately selected without departing from the scope of the invention.

For example, in each embodiment described above, the store such as the convenience store is described as an example. However, the present invention is not limited to such a store, and each of the configuration elements of the person counting device, the person counting system, and the person counting method in the present invention can be widely applied to a place where counting of the number of persons passing through a doorway is advantageous.

In addition, in each embodiment described above, as illustrated in FIG. 4 or the like, the first area and the second area have rectangular shapes. However, the shape of the first area and the second area is not limited to a rectangular shape, and may be a circular or polygonal shape.

In addition, in each embodiment described above, as illustrated in FIG. 2, camera 1 is an omni-directional camera having an imaging range of 360° using a fish-eye lens. However, the camera may be a so-called box camera having a predetermined angle of view.

In addition, in each embodiment described above, person tracker 22 is provided in PC 3. However, it is also possible to configure a person tracking device separate from PC 3. In addition, it is also possible to configure a person tracker as a camera with a person tracking function by integrating the person tracking function into person tracker 22. Furthermore, it is also possible to configure a highly functional camera by integrating the function of moving line acquirer 24 provided in PC 3 into camera 1. As described above, if the functions of PC 3 are integrated into camera 1, the applications installed in PC 3 can be simplified, and the processing load in PC 3 can be significantly reduced.

In addition, in each embodiment described above, PC 3 provided in the store performs the processing necessary for the person counting. However, the necessary processing may be performed by PC 11 provided in a headquarters or by cloud computer 12 that configures a cloud computing system. In addition, the necessary processing may shared with a plurality of information processing devices and the information may be transferred among a plurality of information processing devices via communication media such as an IP network, a LAN, and the like. In this case, the person counting system is configured using a plurality of information processing devices that share the needed processing.

In the configuration described above, among the processing tasks necessary for the person counting, at least the processing tasks in which the amount of calculation is large, for example, the person tracking processing or the moving line acquisition processing, may be performed by a device such as PC 3 provided in the store. According to this configuration, since there remains a small amount of information data required for the remaining processing tasks, even though the remaining tasks may be performed by an information processing device provided at a position other than the store, such as PC 11 installed in a headquarters, the communication load can be reduced. Therefore, it is possible to make it easy to operate the system of the wide area network connection mode.

In addition, among the processing tasks necessary for the person counting, at least the processing tasks in which the amount of calculation is large, for example, the person tracking processing or the moving line acquisition processing may be performed by cloud computer 12. According to this configuration, since there remains a small amount of information data required for the remaining processing tasks, a high speed information processing device is not necessary for the user side such as the store. Therefore, it is possible to reduce a user cost.

In addition, if all of the necessary processing tasks are performed by the cloud computer 12, or at least a function of outputting the person counting results is given to cloud computer 12, the person counting results can be displayed on a mobile terminal such as a smart phone 13 in addition to PC 3 or PC 11 provided in the store or the headquarters. In this way, it is possible to check the person counting results at any place such as a place where the user is visiting in addition to the store or the headquarters. In addition, it is also possible to print out the person counting results using a printer installed in the store or the headquarters.

The person counting device, the person counting system, and the person counting method according to the present invention are effective in reducing omissions in counting the number of persons without using a specialized device and improving the accuracy of counting the number of persons even in a situation in which an event occurs in which it is difficult to identify the person and the background, and thus, the person detection fails when the person detection is performed by using the image imaged by a general monitoring camera. Therefore, the person counting device, the person counting system, and the person counting method are advantageous in counting the number of persons passing through the doorway based on the imaged image in which the surroundings of a doorway for entering or leaving a predetermined place in a store or the like is imaged.

What is claimed is:

1. A person counting device that counts the number of persons passing through a doorway based on an imaged image in which the surroundings of the doorway for entering or leaving a predetermined place in a store or the like are imaged, the device comprising:
   a processor; and
   a memory that stores an instruction,
   the device further comprising, as a configuration when the processor executes the instruction stored in the memory:
   a moving line acquirer that acquires a moving line for each person detected from the imaged image;
   a person counter that counts the persons that have passed through the doorway based on the moving line acquired by the moving line acquirer; and
   an output information generator that generates output information which represents the number of persons that have passed through the doorway based on the counting result of the person counter,
   wherein the person counter includes:
   a moving line interruption detector that detects an interruption of the moving line in the vicinity of the doorway;
   a similarity determinator that determines a similarity between the background image in which the doorway is represented and the person image in which the person is represented in the imaged image; and
   a deemed counter that deems that the person has passed through the doorway and includes the person in the counting target, in a case where the interruption of the moving line in the vicinity of the doorway is detected by the moving line interruption detector and the similarity determinator determines that the background image and the person image are similar.

2. The person counting device of claim 1,
   wherein, in a case where the person moves in a direction of leaving, the similarity determinator acquires the background image from an image area which is a movement destination of the person after the moving line disappears in the imaged image, and in a case where the person moves in a direction of entering, the similarity determinator acquires the background image from an image area which is a movement origin of the person before the moving line appears in the imaged image.

3. The person counting device of claim 1, further comprising:
   an area setter that sets a first area in the imaged image by the input operation of the user so as to include the image area in which the person is positioned at the middle of passing through the doorway, and sets a second area in the vicinity of the first area inside of the store so as to include the image area in which the person coming in and going out from the doorway is positioned, wherein, if the moving line sequentially enters the first area and the second area, the person counter determines that the moving line has passed through the doorway, and then, the person is counted.

4. The person counting device of claim 3, wherein the moving line interruption detector detects the interruption of the moving line in the second area.

5. The person counting device of claim 3, wherein the similarity determinator acquires the background image from the image area of the first area in the imaged image, and determines the similarity between the background image and the person image.

6. The person counting device of claim 1, wherein the similarity determinator extracts feature amounts relating to at least one of brightness information and color information from the background image and the person image respectively, compares each of the feature amounts, and determines the similarity between the background image and the person image.

7. The person counting device of claim 1 further comprising:
an aggregator that aggregates the counting results of the person counter for each predetermined aggregation period and acquires the number of persons for each predetermined aggregation period,
wherein the person counter determines a moving direction of the person passing through the doorway based on the moving line acquired by the moving line acquirer, and separately counts the entering persons and the leaving persons passing through the doorway according to the moving direction,
wherein the aggregator aggregates the counting results of the person counter for each predetermined aggregation period and acquires the number of entering persons and the leaving persons for each predetermined aggregation period, and
wherein the output information generator generates the output information relating to the number of entering persons and the leaving persons for each predetermined aggregation period acquired by the aggregator.

8. A person counting system that counts the number of persons that have passed through a doorway based on an imaged image in which the surroundings of the doorway for entering or leaving a predetermined place in a store or the like are imaged, the system comprising:
a camera that images surroundings of the doorway; and
a plurality of information processing devices,
wherein any one of the plurality of information processing devices includes a processor and a memory that stores an instruction, and the information processing device further includes, as a configuration when the processor executes the instruction stored in the memory:
a person tracker that detects a person from the image imaged by the camera and acquires position information;
a moving line acquirer that acquires a moving line for each person based on the position information acquired by the person tracker;
a person counter that counts the persons passed though the doorway based on the moving line acquired by the moving line acquirer; and
an output information generator that generates output information which represents the number of persons that have passed through the doorway based on the counting results of the person counter, and
wherein the person counter includes:
a moving line interruption detector that detects an interruption of the moving line in the vicinity of the doorway;
a similarity determinator that determines a similarity between the background image in which the doorway is represented and the person image in which the person is represented in the imaged image; and
a deemed counter in which the person is deemed to have passed through the doorway and the person is included as the counting target, in a case where the interruption of the moving line in the vicinity of the doorway is detected by the moving line interruption detector and the similarity determinator determines that the background image and the person image are similar.

9. A person counting method that causes an information processing device to perform the processing of counting the number of persons passing through a doorway based on an imaged image in which the surroundings of a doorway for entering or leaving a predetermined place in a store or the like are imaged,
the method comprising steps of when the processor of the information processing device executes the instruction stored in the memory:
acquiring a moving line for each person detected from the imaged image;
counting the persons that have passed through the doorway based on the moving line acquired by the step of acquiring; and
generating output information which represents the number of persons that have passed through the doorway based on the counting result by the step of counting,
wherein the step of counting the persons includes steps of:
detecting an interruption of the moving line in the vicinity of the doorway;
determining a similarity between the background image in which the doorway is represented and the person image in which the person is represented in the imaged image; and
deeming that the person has passed through the doorway and including the person in the counting target, in a case where the interruption of the moving line in the vicinity of the doorway is detected by the step of detecting the moving line interruption, and the background image and the person image are determined to be similar by the step of determining the similarity.

\* \* \* \* \*